US011573970B2

(12) United States Patent
Shankar et al.

(10) Patent No.: US 11,573,970 B2
(45) Date of Patent: *Feb. 7, 2023

(54) DATABASE SYSTEM FOR TIME SERIES DATA STORAGE, PROCESSING, AND ANALYSIS

(71) Applicant: Palantir Technologies Inc., Palo Alto, CA (US)

(72) Inventors: Ankit Shankar, Redwood City, CA (US); Kirat Singh, New York, NY (US); Kayo Teramoto, San Francisco, CA (US); Lucas Lemanowicz, New York, NY (US); Thomas Hasner, New Brunswick, NJ (US)

(73) Assignee: Palantir Technologies Inc., Denver, CO (US)

( * ) Notice: Subject to any disclaimer, the term of this patent is extended or adjusted under 35 U.S.C. 154(b) by 1046 days.

This patent is subject to a terminal disclaimer.

(21) Appl. No.: 16/261,369

(22) Filed: Jan. 29, 2019

(65) Prior Publication Data

US 2019/0155809 A1 May 23, 2019

Related U.S. Application Data

(63) Continuation of application No. 15/922,752, filed on Mar. 15, 2018, now Pat. No. 10,216,695.
(Continued)

(51) Int. Cl.
*G06F 16/24* (2019.01)
*G06F 16/2458* (2019.01)
(Continued)

(52) U.S. Cl.
CPC .......... *G06F 16/2477* (2019.01); *G06F 9/451* (2018.02); *G06F 16/244* (2019.01);
(Continued)

(58) Field of Classification Search
CPC .............. G06F 16/2477; G06F 16/244; G06F 16/2465; G06F 16/26; G06F 16/335; G06F 17/18; G06F 9/451; H04W 4/38
See application file for complete search history.

(56) References Cited

U.S. PATENT DOCUMENTS 5,532,717 A  7/1996 Jones et al.
5,724,575 A  3/1998 Hoover et al.
(Continued)

FOREIGN PATENT DOCUMENTS

AU  2014206155  12/2015
EP  0652513  5/1995
(Continued)

OTHER PUBLICATIONS

Anonymous, "BackTult—JD Edwards One World Version Control System," printed Jul. 23, 2007 in 1 page.
(Continued)

*Primary Examiner* — Merilyn P Nguyen
(74) *Attorney, Agent, or Firm* — Knobbe, Martens, Olson & Bear, LLP

(57) ABSTRACT

A system includes a communications interface configured to receive a plurality of data series captured by a plurality of sensors. A first database includes at least a first data series of the plurality of data series. A second database includes metadata related to the first data series. One or more processors are configured to receive an instruction including an indication of a computation to perform and metadata filter criteria, query the second database to determine at least a portion of the first data series that satisfies the metadata filter criteria by reference to at least the metadata related to the first data series, access, from the first database and based on results of the query of the second database, the portion of the
(Continued)

first data series, and perform the computation on the portion of first data series accessed from the first database.

19 Claims, 12 Drawing Sheets

Related U.S. Application Data

(60) Provisional application No. 62/561,470, filed on Sep. 21, 2017.

(51) Int. Cl.
| | | |
|---|---|---|
| *H04W 4/38* | (2018.01) | |
| *G06F 9/451* | (2018.01) | |
| *G06F 16/26* | (2019.01) | |
| *G06F 16/242* | (2019.01) | |
| *G06F 16/335* | (2019.01) | |
| *H04L 67/12* | (2022.01) | |
| *G06F 17/18* | (2006.01) | |

(52) U.S. Cl.
CPC .......... *G06F 16/2465* (2019.01); *G06F 16/26* (2019.01); *G06F 16/335* (2019.01); *H04L 67/12* (2013.01); *H04W 4/38* (2018.02); *G06F 17/18* (2013.01)

(56) References Cited

U.S. PATENT DOCUMENTS

| | | | |
|---|---|---|---|
| 5,872,973 | A | 2/1999 | Mitchell et al. |
| 5,897,636 | A | 4/1999 | Kaeser |
| 6,073,129 | A | 6/2000 | Levine et al. |
| 6,094,653 | A | 7/2000 | Li et al. |
| 6,161,098 | A | 12/2000 | Wallman |
| 6,243,717 | B1 | 6/2001 | Gordon et al. |
| 6,304,873 | B1 | 10/2001 | Klein et al. |
| 6,366,933 | B1 | 4/2002 | Ball et al. |
| 6,418,438 | B1 | 7/2002 | Campbell |
| 6,510,504 | B2 | 1/2003 | Satyanarayana |
| 6,549,752 | B2 | 4/2003 | Tsukamoto |
| 6,560,620 | B1 | 5/2003 | Ching |
| 6,574,635 | B2 | 6/2003 | Stauber et al. |
| 6,609,085 | B1 | 8/2003 | Uemura et al. |
| 6,745,382 | B1 | 6/2004 | Zothner |
| 6,976,210 | B1 | 12/2005 | Silva et al. |
| 6,980,984 | B1 | 12/2005 | Huffman et al. |
| 7,058,648 | B1 | 6/2006 | Lightfoot et al. |
| 7,111,231 | B1 | 9/2006 | Huck et al. |
| 7,194,680 | B1 | 3/2007 | Roy et al. |
| 7,233,843 | B2 | 6/2007 | Budhraja et al. |
| 7,461,158 | B2 | 12/2008 | Rider et al. |
| 7,667,582 | B1 | 2/2010 | Waldorf |
| 7,725,530 | B2 | 5/2010 | Sah et al. |
| 7,725,728 | B2 | 5/2010 | Ama et al. |
| 7,730,082 | B2 | 6/2010 | Sah et al. |
| 7,730,109 | B2 | 6/2010 | Rohrs et al. |
| 7,761,407 | B1 | 7/2010 | Stern |
| 7,814,084 | B2 | 10/2010 | Hallett et al. |
| 7,844,892 | B2 | 11/2010 | Shewchenko et al. |
| 7,962,495 | B2 | 6/2011 | Jain et al. |
| 7,984,374 | B2 | 7/2011 | Caro et al. |
| 8,041,714 | B2 | 10/2011 | Aymeloglu et al. |
| 8,060,259 | B2 | 11/2011 | Budhraja et al. |
| 8,112,425 | B2 | 2/2012 | Baum et al. |
| 8,126,848 | B2 | 2/2012 | Wagner |
| 8,185,819 | B2 | 5/2012 | Sah et al. |
| 8,401,710 | B2 | 3/2013 | Budhraja et al. |
| 8,504,542 | B2 | 8/2013 | Chang et al. |
| 8,676,857 | B1 | 3/2014 | Adams et al. |
| 8,930,331 | B2 | 1/2015 | McGrew et al. |
| 8,954,410 | B2 | 2/2015 | Chang et al. |
| 9,009,827 | B1 | 4/2015 | Albertson et al. |
| 9,043,696 | B1 | 5/2015 | Meiklejohn et al. |
| 9,092,482 | B2 | 7/2015 | Harris et al. |
| 9,116,975 | B2 | 8/2015 | Shankar et al. |
| 9,183,649 | B2* | 11/2015 | Pompey .................... G06F 3/01 |
| 9,195,700 | B1 | 11/2015 | Becker |
| 9,208,159 | B2 | 12/2015 | Stowe et al. |
| 9,230,280 | B1 | 1/2016 | Maag et al. |
| 9,280,532 | B2 | 3/2016 | Cicerone |
| 9,501,851 | B2* | 11/2016 | Cervelli .............. G06F 16/2477 |
| 9,672,257 | B2 | 6/2017 | Tobin et al. |
| 9,753,935 | B1 | 9/2017 | Tobin et al. |
| 10,216,695 | B1* | 2/2019 | Shankar .............. G06F 16/2465 |
| 11,006,838 | B2* | 5/2021 | Coleman ................ A61B 5/015 |
| 11,016,986 | B2* | 5/2021 | Duffield .............. G06F 16/245 |
| 2001/0051949 | A1 | 12/2001 | Carey et al. |
| 2001/0056522 | A1 | 12/2001 | Satyanarayana |
| 2002/0091694 | A1 | 7/2002 | Hrle et al. |
| 2003/0105759 | A1 | 6/2003 | Bess et al. |
| 2003/0115481 | A1 | 6/2003 | Baird et al. |
| 2003/0120675 | A1 | 6/2003 | Stauber et al. |
| 2003/0130993 | A1 | 7/2003 | Mendelevitch et al. |
| 2003/0212718 | A1 | 11/2003 | Tester |
| 2004/0111410 | A1 | 6/2004 | Burgoon et al. |
| 2004/0117345 | A1 | 6/2004 | Bamford et al. |
| 2004/0117387 | A1 | 6/2004 | Civetta et al. |
| 2004/0148301 | A1 | 7/2004 | McKay et al. |
| 2005/0097441 | A1 | 5/2005 | Herbach et al. |
| 2005/0108231 | A1 | 5/2005 | Findleton et al. |
| 2005/0114763 | A1 | 5/2005 | Nonomura et al. |
| 2005/0131990 | A1 | 6/2005 | Jewell |
| 2005/0289524 | A1 | 12/2005 | McGinnes |
| 2006/0074881 | A1 | 4/2006 | Vembu et al. |
| 2006/0080316 | A1 | 4/2006 | Gilmore et al. |
| 2006/0095521 | A1 | 5/2006 | Patinkin |
| 2006/0106847 | A1 | 5/2006 | Eckardt et al. |
| 2006/0116991 | A1 | 6/2006 | Calderwood |
| 2006/0129554 | A1 | 6/2006 | Suyama et al. |
| 2006/0161558 | A1 | 7/2006 | Tamma et al. |
| 2006/0218206 | A1 | 9/2006 | Bourbonnais et al. |
| 2006/0218405 | A1 | 9/2006 | Ama et al. |
| 2006/0218491 | A1 | 9/2006 | Grossman et al. |
| 2006/0242630 | A1 | 10/2006 | Koike et al. |
| 2006/0253502 | A1 | 11/2006 | Raman et al. |
| 2006/0265397 | A1 | 11/2006 | Bryan et al. |
| 2006/0288035 | A1 | 12/2006 | Viavant |
| 2007/0050429 | A1 | 3/2007 | Goldring et al. |
| 2007/0061487 | A1 | 3/2007 | Moore et al. |
| 2007/0143253 | A1 | 6/2007 | Kostamaa et al. |
| 2007/0185850 | A1 | 8/2007 | Walters et al. |
| 2007/0233756 | A1 | 10/2007 | D'Souza et al. |
| 2007/0271317 | A1 | 11/2007 | Carmel |
| 2008/0015970 | A1 | 1/2008 | Brookfield et al. |
| 2008/0104060 | A1 | 5/2008 | Abhyankar et al. |
| 2008/0104149 | A1 | 5/2008 | Vishniac et al. |
| 2008/0195672 | A1 | 8/2008 | Hamel et al. |
| 2008/0201339 | A1 | 8/2008 | McGrew |
| 2008/0215546 | A1 | 9/2008 | Baum et al. |
| 2008/0270316 | A1 | 10/2008 | Guidotti et al. |
| 2008/0301378 | A1 | 12/2008 | Carrie |
| 2009/0031247 | A1 | 1/2009 | Walter et al. |
| 2009/0106308 | A1 | 4/2009 | Killian et al. |
| 2009/0164387 | A1 | 6/2009 | Armstrong et al. |
| 2009/0177962 | A1 | 7/2009 | Gusmorino et al. |
| 2009/0254971 | A1 | 10/2009 | Herz |
| 2009/0271435 | A1 | 10/2009 | Yako et al. |
| 2009/0313223 | A1 | 12/2009 | Rantanen |
| 2009/0313311 | A1 | 12/2009 | Hoffmann et al. |
| 2010/0036831 | A1 | 2/2010 | Vemuri et al. |
| 2010/0070489 | A1 | 3/2010 | Aymeloglu et al. |
| 2010/0076939 | A1 | 3/2010 | Iwaki et al. |
| 2010/0082541 | A1 | 4/2010 | Kottomtharayil |
| 2010/0114817 | A1 | 5/2010 | Breeder et al. |
| 2010/0114831 | A1 | 5/2010 | Gilbert et al. |
| 2010/0114887 | A1 | 5/2010 | Conway et al. |
| 2010/0138842 | A1 | 6/2010 | Balko et al. |
| 2010/0145909 | A1 | 6/2010 | Ngo |
| 2010/0161565 | A1 | 6/2010 | Lee et al. |
| 2010/0161688 | A1 | 6/2010 | Kesselman et al. |
| 2010/0191884 | A1 | 7/2010 | Holenstein et al. |
| 2010/0211550 | A1 | 8/2010 | Daniello et al. |

(56) References Cited

U.S. PATENT DOCUMENTS

| | | |
|---|---|---|
| 2010/0211618 A1 | 8/2010 | Anderson et al. |
| 2010/0235606 A1 | 9/2010 | Oreland et al. |
| 2010/0283787 A1 | 11/2010 | Hamedi et al. |
| 2010/0325581 A1 | 12/2010 | Finkelstein et al. |
| 2011/0029498 A1 | 2/2011 | Ferguson et al. |
| 2011/0047540 A1 | 2/2011 | Williams et al. |
| 2011/0141845 A1* | 6/2011 | Peacock .............. G01V 1/22 367/13 |
| 2011/0153592 A1 | 6/2011 | DeMarcken |
| 2011/0173619 A1 | 7/2011 | Fish |
| 2011/0184813 A1 | 7/2011 | Barne et al. |
| 2011/0218978 A1 | 9/2011 | Hong et al. |
| 2011/0258158 A1 | 10/2011 | Resende et al. |
| 2011/0258242 A1 | 10/2011 | Eidson et al. |
| 2011/0270812 A1 | 11/2011 | Ruby |
| 2012/0072825 A1 | 3/2012 | Sherkin et al. |
| 2012/0123989 A1 | 5/2012 | Yu et al. |
| 2012/0124179 A1 | 5/2012 | Cappio et al. |
| 2012/0150791 A1 | 6/2012 | Willson |
| 2012/0150925 A1 | 6/2012 | Gupta et al. |
| 2012/0159307 A1 | 6/2012 | Chung et al. |
| 2012/0221589 A1 | 8/2012 | Shahar et al. |
| 2012/0330908 A1 | 12/2012 | Stowe et al. |
| 2012/0330931 A1 | 12/2012 | Nakano et al. |
| 2013/0036346 A1 | 2/2013 | Cicerone |
| 2013/0060742 A1 | 3/2013 | Chang et al. |
| 2013/0066882 A1 | 3/2013 | Westbrooke |
| 2013/0097130 A1 | 4/2013 | Bingol et al. |
| 2013/0103657 A1 | 4/2013 | Ikawa et al. |
| 2013/0151388 A1 | 6/2013 | Falkenborg et al. |
| 2013/0304770 A1 | 11/2013 | Boero et al. |
| 2013/0318060 A1 | 11/2013 | Chang et al. |
| 2014/0040276 A1 | 2/2014 | Chen et al. |
| 2014/0095543 A1 | 4/2014 | Hsiao et al. |
| 2014/0101139 A1 | 4/2014 | Gemert et al. |
| 2014/0149272 A1 | 5/2014 | Hirani et al. |
| 2014/0181833 A1 | 6/2014 | Bird et al. |
| 2014/0324876 A1 | 10/2014 | Konik et al. |
| 2014/0344231 A1 | 11/2014 | Stowe et al. |
| 2015/0039886 A1 | 2/2015 | Kahol et al. |
| 2015/0089353 A1 | 3/2015 | Folkening |
| 2015/0106347 A1 | 4/2015 | McGrew et al. |
| 2015/0112956 A1 | 4/2015 | Chang et al. |
| 2015/0186338 A1 | 7/2015 | Mirra et al. |
| 2015/0186434 A1 | 7/2015 | Eichinger et al. |
| 2015/0199010 A1* | 7/2015 | Coleman .............. G06F 3/015 345/156 |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0278325 A1 | 10/2015 | Masuda et al. |
| 2015/0341467 A1 | 11/2015 | Lim et al. |
| 2015/0379065 A1 | 12/2015 | Yoshizawa et al. |
| 2016/0034545 A1 | 2/2016 | Shankar et al. |
| 2016/0062555 A1 | 3/2016 | Ward et al. |
| 2016/0088013 A1 | 3/2016 | Watson et al. |
| 2016/0164912 A1 | 6/2016 | Del Fante |
| 2016/0275432 A1 | 9/2016 | Guinness et al. |
| 2016/0328432 A1 | 11/2016 | Raghunathan |
| 2017/0249763 A1* | 8/2017 | Garvey .............. G06T 11/206 |
| 2017/0270172 A1 | 9/2017 | Tobin et al. |
| 2017/0355036 A1 | 12/2017 | Rozmarynowski et al. |
| 2018/0039651 A1 | 2/2018 | Tobin et al. |
| 2018/0181629 A1 | 6/2018 | Stowe et al. |
| 2018/0293284 A1* | 10/2018 | Shah .............. G06F 16/2477 |
| 2018/0322171 A1* | 11/2018 | Valenti .............. G01C 21/206 |
| 2019/0050688 A1* | 2/2019 | Iyer .............. A61B 5/349 |
| 2020/0064226 A1* | 2/2020 | Wilson .............. G01M 11/083 |

FOREIGN PATENT DOCUMENTS

| | | |
|---|---|---|
| EP | 1126384 | 8/2001 |
| EP | 2555126 | 2/2013 |
| EP | 2863326 | 4/2015 |
| EP | 2891992 | 7/2015 |
| EP | 2993595 | 3/2016 |
| EP | 3101560 | 12/2016 |
| EP | 3279813 | 2/2018 |
| EP | 3343403 | 7/2018 |
| WO | WO 2008/043082 | 4/2008 |
| WO | WO 2012/025915 | 3/2012 |
| WO | WO 2014/019349 | 2/2014 |

OTHER PUBLICATIONS

Antoshenkov, Gennady, "Dictionary-Based Order-Preserving String Compression", The VLDB Journal, pp. 26-39, 1997.

Apache HBase.

The Apache Cassandra Project.

Baker et al., "Megastore: Providing Scalable, Highly Available Storage for Interactive Services", 5th Biennial Conference on Innovative Data Systems Research (CIDR '11), Asilomar, California, Jan. 9-12, 2011.

Bernstein et al., "Hyder—A Transactional Record Manager for Shared Flash", 5th Biennial Conference on Innovative Data Systems Research (CIDR '11), vol. 12, Asilomar, California, Jan. 9-12, 2011.

Chang et al., "Bigtable: A Distributed Storage System for Structured Data", Google, Inc., OSDI'06: Seventh Symposium on Operating System Design and Implementation, Seattle, WA, Nov. 2006.

Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.

Devanbu et al., "Authentic Third-party Data Publication", http://www.cs.ucdavis.edu/~devanbu/authdbpub.pdf, p. 19, accessed on Feb. 6, 2012.

Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.

Elmasri et al., "Fundamentals of Database Systems", Fourth Edition, pp. 455-491, 2004.

Hogue et al., "Thresher: Automating the Unwrapping of Semantic Content from the World Wide Web", 14th International Conference on World Wide Web, WWW 2005: Chiba, Japan, May 10-14, 2005.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontology Management System (Design)", Information Societies Technology Programme, pp. 1-27.

Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.

Miklau et al., "Securing History: Privacy and Accountability in Database Systems," 3rd Biennial Conference on Innovative Data Systems Research (CIDR), Jan. 7-10, 2007, Asilomar, California, pp. 387-396.

Niepert et al., "A Dynamic Ontology for a Dynamic Reference Work", Joint Conference on Digital Libraries, Jun. 17_22, 2007, Vancouver, British Columbia, Canada, pp. 1-10.

Nierman, "Evaluating Structural Similarity in XML Documents", 6 pages, 2002.

Peng et al., "Large-scale Incremental Processing Using Distributed Transactions and Notifications", Proceedings of the 9th USENIX Symposium on Operating Systems Design and Implementation, USENIX, p. 14, 2010.

Quest, "Toad for ORACLE 11.6—Guide to Using Toad," Sep. 24, 2012, pp. 1-162.

(56) References Cited

OTHER PUBLICATIONS

Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.
Wikipedia, "Federated Database System," Sep. 7, 2013, retrieved from the internet on Jan. 27, 2015 http://en.wikipedia.org/w/index.php?title=Federated_database_system&oldid=571954221.
Wollrath et al., "A Distributed Object Model for the Java System," Conference on Object-Oriented Technologies and Systems, Jun. 17-21, 1996, pp. 219-231.
Yang et al., "HTML Page Analysis Based on Visual Cues", A129, pp. 859-864, 2001.
Zhao et al., "Exploratory Analysis of Time-Series with ChronoLenses," IEEE Transactions on Visualization and Computer Graphics, vol. 17, No. 12, Oct. 23, 2011, pp. 2422-2431.
Official Communication for U.S. Appl. No. 15/922,752 dated Jun. 1, 2018.
U.S. Pat. No. 10,216,695, Database System for Time Series Data Storage, Processing, and Analysis, Feb. 26, 2019.

\* cited by examiner

401

| Trials | 402 | × |
|---|---|---|
| 2016 ABC trials | 1500 Trials | ⚙ |
| 2016 ABC Best trials | 280 Trials | ⚙ |
| 2017 Elastic Material trials | 1100 Trials | ⚙ |
| test 403 | 1000 Trials | ⚙ |

⊙ Add Static Trial Set
⊙ Add Derived Trial Set
⊙ Add Statistics Trial Set
⊙ Add telemetry Series
⊙ Add Derived series
⊙ Add Trial Scalar Series 🗑 Remove　　　　Go

406

| test | × |
|---|---|
| Static Trial Selection | |

⬇ Import Selected Trials

🗑 Remove　　　　Go

409

2016 ABC Best Trials　×
Input Trial Set
All Trials
Filters
Group By
[Location ×] [Operator ×]　▽
Trial Scalar Property
Trial Time　▽
VARIABLES
| VALUE | AVERAGE | COUNT | MAX | MIN | OTHER |
VALUE == MIN 🗑 Remove　　　　Go

407

2016 ABC Best Trials　×
Input Trial Set
All Trials
FILTERS 408
[Conjunction (AND)]　[Disjunction (OR)]

[Year ▽] ▽△ [2016 ▽] ⊗
[Operator ▽] ▽△ [ABC ▽] ⊗

⊕ Add Filter

🗑 Remove　　　　Go

Slowest Trials　×
Input Trial Set [2016 Trials ▽]
Aggregations [Max ▽]
Data Series
[Trial Time ▽]

🗑 Remove　　　　Go

411

Untitled　×
[Operate on Groups] [Operate on Segments]
Aggregations [Average ▽]
DATA SERIES
INPUT SERIES
[Avg temp high ×] [Avg temp low ×] ▽
PARAMETER NAMES
• C1 - Average temp high
• C2 - Average temp low

C1 - C2

🗑 Remove　　　　Go

DATABASE SYSTEM FOR TIME SERIES DATA STORAGE, PROCESSING, AND ANALYSIS

CROSS REFERENCE TO RELATED APPLICATIONS

This application is a continuation of U.S. patent application Ser. No. 15/922,752, filed Mar. 15, 2018 and titled "DATABASE SYSTEM FOR TIME SERIES DATA STORAGE, PROCESSING, AND ANALYSIS", which claims the benefit of U.S. Provisional Patent Application No. 62/561,470, filed Sep. 21, 2017 and titled "DATABASE SYSTEM FOR TIME SERIES DATA STORAGE, PROCESSING, AND ANALYSIS." The entire disclosure of each of the above items is hereby made part of this specification as if set forth fully herein and incorporated by reference for all purposes, for all that it contains. Any and all applications for which a foreign or domestic priority claim is identified in the Application Data Sheet as filed with the present application are hereby incorporated by reference under 37 CFR 1.57.

TECHNICAL FIELD

The present disclosure relates to database systems. More specifically, the disclosure includes techniques for performing operations on large volumes of time series data at faster speeds.

BACKGROUND

A data system can receive large amounts of time series data from multiple physical sensors. Over time, the collection of time series data may grow and become unmanageably large. Previous efforts to analyze the vast amounts of data using spreadsheet or manual data analysis computer programs were either slow or unsuccessful, in part because each operation may read the entirety of the stored data. Furthermore, dynamic investigation of the time series data may not have been possible with previous tools. Instead, different analyses may have been individually coded and executed, even when the same or similar underlying data was being analyzed.

SUMMARY

One aspect features a system comprising: a communications interface configured to receive a plurality of data series, the plurality of data series including time series data captured by a plurality of sensors; one or more storage devices configured to store: a first database including at least a first data series of the plurality of data series; and a second database including metadata related to the first data series; and one or more processors configured to: receive an instruction including an indication of a computation to perform and metadata filter criteria; query the second database to determine at least a portion of the first data series satisfies the metadata filter criteria; access, from the first database and based on results of the query of the second database, the portion of the first data series; and perform the computation on the portion of first data series accessed from the first database.

The system can feature additionally feature any combination of the following. The one or more processors are further configured to: query the second database to determine at least a portion of a second data series satisfies the metadata filter criteria; access, from the first database and based on results of the query of the second database, the second data series; and determine a portion of the second data series that satisfies a threshold criteria. The portion of the first data series corresponds with the portion of the second data series that satisfies the threshold criteria. The plurality of data series includes time series data measured by a plurality of sensors for a plurality of trials, and wherein the plurality of sensors includes different sensors that make different types of measurements. The metadata includes a configuration of a device being tested during a trial. The metadata includes at least one of a storage location of, a reference to, or an identifier of the first data series. The metadata includes a first metadata field that applies to the entirety of the first data series and a second metadata field that applies to less than the entirety of the first data series. The one or more processors are further configured to: query the second database to determine how many data series satisfy the metadata filter criteria; and transmit a number of data series that satisfy the metadata filter criteria to another computer. The query the second database to determine at least a portion of the first data series satisfies the metadata filter criteria can be performed with reference to at least the metadata related to the first data series. The computation includes determining at least one of: a maximum, average, count, specific values, correlation, or standard deviation.

Another aspect features a computer system comprising: one or more computer readable storage devices configured to store one or more software modules including computer executable instructions; and one or more hardware computer processors in communication with the one or more computer readable storage devices and configured to execute the computer executable instructions in order to cause the computer system to: query a first database in a server for available metadata fields associated with a plurality of data series stored in a second database; display one or more menus for configuring an aggregate analysis, the one or more menus displaying: the available metadata fields; one or more ways to define the aggregate analysis; receive a selection of a filter criteria comprising a subset of the available metadata fields; receive a selection of an aggregate analysis to perform; send a request for the server to perform the aggregate analysis on the plurality of data series stored in the second database that satisfy the filter criteria; receive a result of the aggregate analysis from the server; and cause display of a graphical visualization of the result.

The computer system can feature any combination of the following. The one or more hardware computer processors are further configured to execute the computer executable instructions in order to cause the computer system to: cause a display of a representation of a number of data series associated with each metadata field in the first database. The one or more hardware computer processors are further configured to execute the computer executable instructions in order to cause the computer system to: cause a display of a representation of a number of data series associated with a first metadata field in the first database; and cause a display of a representation of a number of data series that are both associated with both the first metadata field and satisfy the filter criteria. The one or more hardware computer processors are further configured to execute the computer executable instructions in order to cause the computer system to: cause a display of a representation of a number of data series associated with the selected filter criteria in the first database. The aggregate analysis is a correlation analysis. The graphical visualization is an X-Y scatterplot. The X-Y scatterplot depicts a third dimension with colored data points. The one or more hardware computer processors are further configured to execute the computer executable instructions in order to cause the computer system to: after a new data series is stored in the second database, send a second request for the server to perform the aggregate analysis on the plurality of data series stored in the second database that satisfy the filter criteria, wherein the new data series satisfies the filter criteria; receive a second result of the aggregate analysis from the server, the second result being based at least in part on the new data series; and cause a display of a graphical visualization of the second result. The one or more hardware computer processors are further configured to execute the computer executable instructions in order to cause the computer system to: receive a definition of a variable, wherein the filter criteria references the variable when the variable has a first value; and determine second filter criteria when the variable has a second value; send a second request for the server to perform the aggregate analysis on the plurality of data series stored in the second database that satisfy the second filter criteria; receive a second result of the aggregate analysis from the server; and cause a display of a second graphical visualization of the second result. The one or more hardware computer processors are further configured to execute the computer executable instructions in order to cause the computer system to: receive a second selection of second filter criteria comprising a second subset of the available metadata fields; receive a second selection of a second aggregate analysis to perform; send a second request for the server to perform the second aggregate analysis on the plurality of data series stored in the second database that satisfy the second filter criteria; receive a second result of the second aggregate analysis from the server; and cause a simultaneous display of a second graphical visualization of the second result on a same interface that the graphical visualization of the result is displayed.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 4 shows an example interface for aggregating trial sets.

DETAILED DESCRIPTION

Overview

Figure 1:
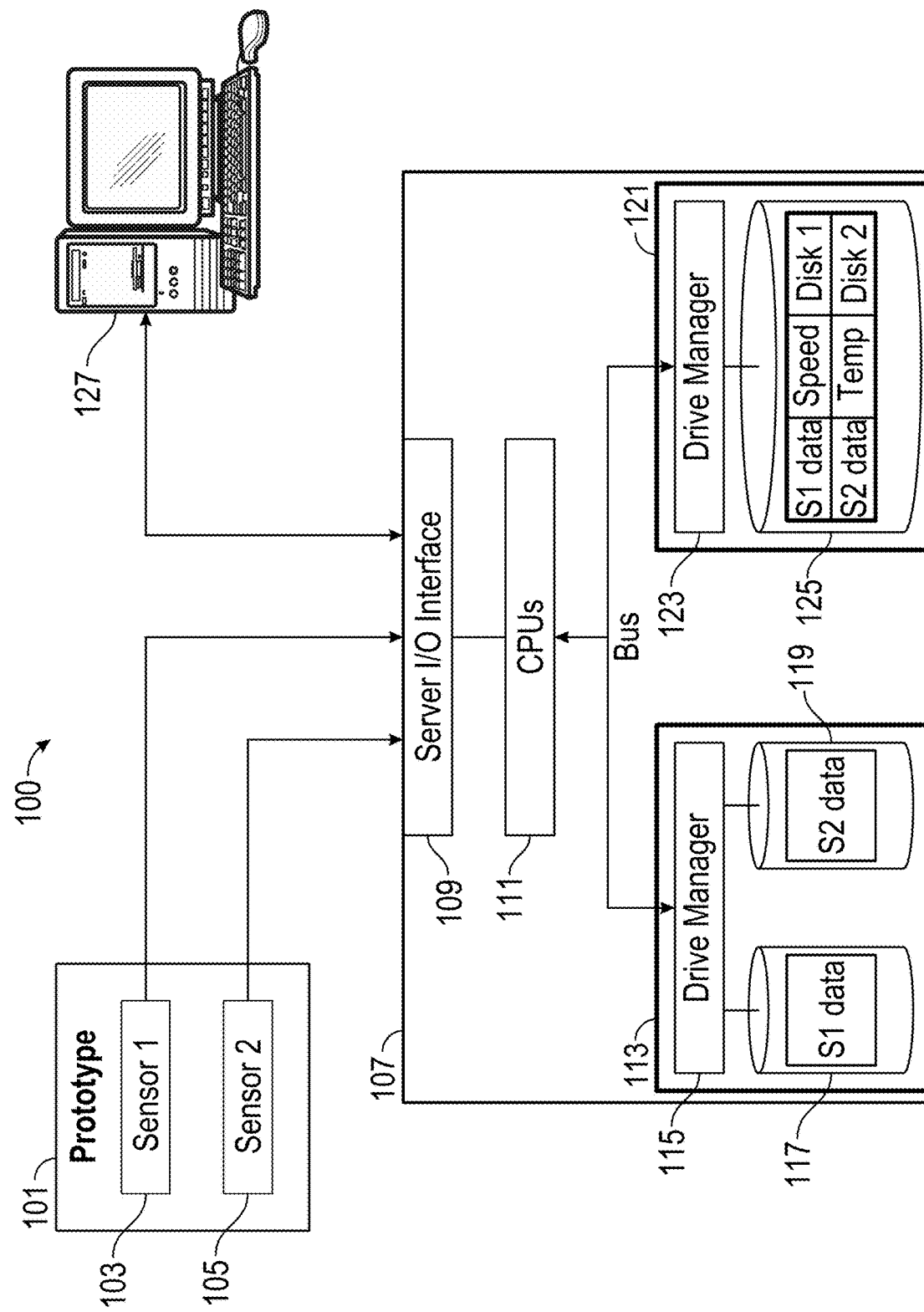
FIG. 1 illustrates a system for storing and quickly accessing time series data.

Despite substantial advances in computer processing power over the past years, some computing tasks still take impractically long amounts of time, especially when many gigabytes, terabytes, petabytes, or exabytes of data are involved.

In one example, time series data is collected from sensors for analysts to see how different variables affect performance. Sometimes, multiple modifications can be made to an underlying prototype, and then sensors collect various types of data associated with the prototype. Sensors measure wind, speed, pressure, forces, temperature, etc. Time series data can be routinely collected from the sensors at the prototype as different trials are run on the prototype with different configurations, in different places, under different weather conditions, by different people, with different parts, etc. Sometimes, sensor data is simultaneously gathered for multiple prototypes. Sensor data can be gathered over long periods of time and stored into a database.

Initially, aggregate analysis of the sensor data can be performed using spreadsheets or mathematical computation tools. Analysis could include, for example, analyzing all of the sensor data to determine how one variable affects another, such as how the temperature of a particular component affects the speed. Such analysis might include reading all temperature data of that component for all prototypes, reading the speed data for all prototypes, and comparing temperature and speed data by computing averages of the speeds for all prototypes across different temperature increments. When only megabytes of data were involved, such brute force aggregate analysis takes relatively little time, but the amount of time grows and becomes unreasonably large when large amounts of data are involved.

Each computation takes time. A typical 4 TB, 5400 RPM platter hard drive costs about $100-$150 and has a seek time of about 10 milliseconds. Solid state hard drives (SSDs) have seek times that are about 100 times faster, but solid state drives can also cost about 10 to 20 times as much as a platter hard drive. A typical processor has a clock speed of about 3-4 GHz and about 2-4 physical cores.

To perform the example calculation, each time series data can be read from a hard drive. In an example using platter hard drives to determine how temperature of a particular component affects speed, a header portion or title of each data series in a database can be first read to determine if the data series is a temperature data series or a speed data series. If the database includes 1,000 data series, then the process of seeking each data series might take about 10 seconds. After that, the comparing computations and averaging computations can be performed.

However, very large amounts of data can be collected, and the amount of time to perform the aggregate analysis can become impractical. For example, data can be collected from 20 or more sensors on 10 different prototypes, 5 days a week, over the course of a year. This results in a database of 5.2 million data series. The seek time to find each data series on a hard drive may take 52,000 seconds (about 867 minutes or 14.5 hours). This is similar to a sequentially reading all data at a speed of about 76.6 MB/s for 5.2 million data series having file sizes of about 0.77 MB each over 14.5 hours. Regardless if the bottleneck is caused by read speeds or by seek speeds, such computation speeds are impractically slow. 14.5 hours is longer than a business day; an analyst starting the computation in the morning won't even have the answer by the end of a business day. Whether this is performed when the aggregate analysis is performed or even if the data is pre-fetched into RAM, it still takes a long time to perform one aggregate analysis operation. The problem only grows as more and more sensor data is collected.

Using a solid state hard drive could substantially reduce the time by about 50-100 times, bringing the time down to as low as about 1.45 hours for 4 TB of sensor data, but at about 5-10 times the cost.

To further reduce data access/read times, the sensor data can be stored in a database on a plurality of hard drives and/or in a distributed manner. The database can include a sharded arrangement of data, a RAID (redundant array of independent disks) setup where data can be read from different hard drives in parallel, and/or another appropriate or similar arrangement. A second SSD used in a distributed arrangement or RAID can cause the sensor data to be read in parallel in 50% of the time (about 44 minutes) compared to a single SSD (about 88 minutes), but the cost of the drives is increased by 100%. However, there are diminishing returns. A third SSD costs the same as the second SSD, but the theoretical completion time of 33% of the time (29 minutes) compared to a single SSD is only about a 17% (or 15 minute) improvement over the two SSD setup. Furthermore, the processor becomes bottlenecked when too many SSDs send data at the same time in parallel.

To further reduce data access/read times, a second database can be used. The second database can include metadata about the sensor data in the first database. For example, the metadata can include which of the time series data are temperature data and speed data. In the example with twenty sensors, each sensor might measure a different variable. Therefore, instead of finding and reading all sensor data to determine which CSVs are speed data or temperature data, a single data structure in a database can be read to determine the same information. Then, the specific sensor data can be retrieved from the first database. For example, only two out of every twenty sensor data are sought and read. This reduces the theoretical time by 90% (e.g., a 10× improvement) at the cost of adding the second database. The metadata can be much smaller in size than the actual time series data, so the second database can be smaller than the first database, and the total cost can be less than double the cost of the first database. The access and read time for the metadata can be small or negligible compared to the access and read times for the 4 TB of sensor data. Accordingly, the 29 minute analysis described above can then be reduced to about 2.9 minutes. Along similar principles, a substantial amount of time can be saved in situations where it is desirable to aggregate data across a subset of trials, such as all trials where a device under test had a particular configuration. Instead of finding and reading all test data to determine which tests were conducted when the device under test had that particular configuration, the information data structure in the database can be read to determine the same information.

In one example embodiment, engineers can use the system disclosed herein to improve a machine's performance and reliability. For example, prototypes can be tested, and a data pipeline can deliver thousands of channels of time series data gathered from the prototypes during the each trial, along with accompanying metadata. Aggregate analysis on the new time series data can then be performed very quickly. Some aggregate analysis can be performed within a few seconds or in under a minute. Based on the aggregate analysis, the engineers could evaluate hypothesis, make modifications to the prototypes, run more trials, and perform aggregate analysis on more data. Due to the speed of the aggregate analysis, multiple trials for different prototype configurations could be made every day, and a high performance prototype with world-leading performance can be quickly developed. Mathematical laboratory programs and workbook programs running similar analysis can take about 30 minutes or longer, and prototype development can occur at a much slower pace, and greatly slowing the rate at which the prototype could be analyzed and modified. Part of the reason why workbook programs can be slow is because workbook programs would sometimes load all available data into the workbook program memory before performing aggregate analysis.

Aggregate analysis of large amounts of data allows large amounts of data to be analyzed. For example, in some embodiments, there can be over 100,000 data points, over 1 million or 1 billion data points, over 10,000 data series, over 1 million data series, over 1 billion data series, over 500 GB of data, over 1 TB of data, over 4 TB of data, etc.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Telemetry Series: a data series having data values that represent measurements.

Derived Series: a data series having data values created from the manipulation, aggregation, or any other combination of one or more other data series.

Static Series: a data series based on underlying data that is fixed.

Example System Configuration for Faster Data Analysis

FIG. 1 illustrates a system 100 for storing and quickly accessing time series data. The system includes a device under test or prototype 101, a plurality of sensors 103 and 105, a server 107, a server input/output interface 109, one or more processors 111, a first database 113, a drive manager 115, a first hard drive 117 storing time series data from the first sensor, a second hard drive 119 storing time series data from the second sensor, a second database 121, a second drive manager 123, a third hard drive 125 storing metadata about the time series data, and a computer 127.

The prototype 101 or device under test or observation can be any sort of device for which data can be collected and analyzed. The device under test can be, for example, any machinery, part of a machine, or system for which data is gathered. The device under test is not restricted to prototypes under development, but can also include for example, a purchased end-user product, a product in maintenance, etc. The prototype may have one or more properties that include its configuration, its material, its layout, its shape, etc. that might influence the performance of the prototype. The prototype can refer to any device under test or observation, which can be any device for which sensor data is gathered, and is not limited to devices for which a specific feature is being tested or devices being visually observed. One or more sensors 103, 105 gather data about the performance of the prototype. The sensors can measure temperature, direction, speed, forces, location, pressure, rigidity, air pressure, moisture, or any other variable. The sensors can generate time series data. In some embodiments, the time series data can be compressed. The time series data can be provided to and stored in a server 107. In some embodiments, the time series data can be provided for each trial that the prototype goes through, and the time series data is stored for each individual sensor. For example, time series data for a measured engine temperature can be stored as comma separated values (CSV) during a trial of a prototype boat. A separate CSV file can be stored for the time series data of engine pressure for the same trial. Yet another CSV file can be stored for the engine temperature during a different trial.

Server 107 can include an input/output interface 109 to communicate with other devices such as the sensors 103, 105 and the computer 107. The server 107 can receive the sensor data and store the sensors in a first database 107. In some embodiments, the sensors can be data sources that provide time series data to be stored in and accessed from a data store, for example, as shown in FIGS. 1A, 1B, 2A, and 2B in U.S. Pat. No. 9,672,257, issued Jun. 6, 2017 (application Ser. No. 15/171,494, filed Jun. 2, 2016). Examples of organization and uses of time series data is also discussed with respect to FIGS. 1A, 1B, 2A-2C, 3A, 3B, 4A-4C, and 5A-5D in U.S. patent application Ser. No. 15/226,675, filed Aug. 2, 2016.

The first database 113 includes a drive manager 115. The drive manager 115 can implement a distributed or redundant data storage scheme among a plurality of hard drives 117, 119. The drive manager 115 can also implement a data storage scheme based on metadata. For example, data from one sensor can be stored on a first hard drive while data from a second sensor is stored on a second hard drive. As a different example, sensor data relating to temperature data can be spread across multiple drives so that it can be more quickly read in parallel.

A second database 121 includes a drive manager 123 and a third hard drive 125. The third hard drive 125 stores metadata about the time series data in the first database. The metadata can include any type of information that is constant across a trial, or at least constant within portions of the trial. For example, the metadata can include which sensor collected the data, what type of data was collected by the sensor, and what test configuration the prototype had during the trial. The metadata can also include identification and storage information. For example, the metadata can include a unique identifier of the time series data and information about the location of the time series data in the first database, such as which hard drive(s) the time series data is stored on, a physical address or virtual address indicating the storage location of the time series data, etc. Additional metadata can include any of the one or more properties about the prototype, including its configuration, its materials, its layout, its shape, etc. Additional metadata can also include a trial number, a trial location, a time that the trial was performed, an operator who executed the trial, and other information about the trial during which the sensor data was collected. In some embodiments, the additional metadata can be extracted from header information in the time series data, manually entered, retrieved from another database, or otherwise received or determined. The metadata can be received when the sensor data is provided to the server or at any time before or after an analysis is performed. In some embodiments, the second database 121 is a PostgreSQL database.

The computer 127 can be used to initiate aggregate analysis on the time series data stored in the first database 113. The computer 127 can send requests for the time series data from the server 107 through the server input/output interface 109, and the computer can receive the time series data and perform the aggregate analysis. In some embodiments, the computer 127 can send requests for the server 107 to use the server's processors 111 to perform the aggregate analysis on the time series data in the first database 113, and the server 107 sends results of the aggregate analysis to the computer 127. An analyst may use the computer 127 to perform aggregate analysis and subsequently modify the aggregate analysis or subsequently perform further aggregate analysis. The computer 127 and/or server can store and re-use the results of the aggregate analysis for subsequently performing the further aggregate analysis without needing to re-compute the aggregate analysis. In some embodiments, the analyst interacts through an application or browser interface on the computer 127.

In an example embodiment, the prototype is a robotic arm. The robotic arm can be made with different materials, have different body shapes, use metals of different softness, be driven by different drivers, have different electronic control or timing algorithms in its engine control unit, different suspension configurations, etc. Sensors on the robotic arm can collect time series data including speed, velocity, acceleration, jerk, tension, pressures on different components, temperatures, forces, pressure across different surfaces, rotation of joints, slip, etc. The sensors can collect the data over trials in different environments (e.g., wind tunnel, indoors, outdoors, in rain). Each time series data is provided for a trial in an environment for which the robotic arm was tested. Time series data recorded across multiple trials can be cut at each trial and saved in sections for each trial. If 20 different sensors collect data at 10 times per second, each measurement being a 1 byte numerical value, then 200 bytes of data are being generated per second, 1 kilobyte of data every 5 seconds, and one megabyte of data every 3 minutes and 20 seconds. A gigabyte of data would be generated about once every 55.5 hours. If seven prototypes were tested every day with a similar setup, a gigabyte of data would be generated about every 8 hours, or about every working business day. This results in about 250 gigabytes of data over the course of a 50 workweek year. A terabyte of data can be generated in four years, or in just one year if there are more tests, sensors, prototypes, and/or measurements per second.

In other embodiments, the sensors can measure properties such as temperature, wind, speed, direction, velocity, acceleration, jerk, power, voltage, current, size, length, time, mass, weight, luminosity, energy, acidity, rates of change, pH, pressure, or any other measurable variable. The underlying prototype can be cars, boats, airplanes, electronic devices, machinery, assembly lines, etc. In some embodiments, the sensors can even be used to gather data in applications without an underlying physical device being tested, such as gathering weather data, geology data, oceanic data, data about production processes, etc. Each time series data can be time series data collected for during a trial.

Although FIG. 1 illustrates an example embodiment where the time series data and metadata are stored on three different hard drives, in various embodiments, the time series data and the metadata can be stored on more or fewer hard drives. For example, in some embodiments, the first and second databases 113, 121 can be included on the same hard drive. In some embodiments, the first database can span over 8 or 16 hard drives. In some embodiments, the metadata can span multiple hard drives instead of the one hard drive 125 as shown. In some embodiments one or more hard drives can be used for both databases and store both metadata and sensor data. In some embodiments, the hard drives 117, 119, 125 include a plurality of hard drives configured as part of a distributed and/or redundant data management scheme (and/or a "cloud" database).

Example Interfaces

Figure 2:
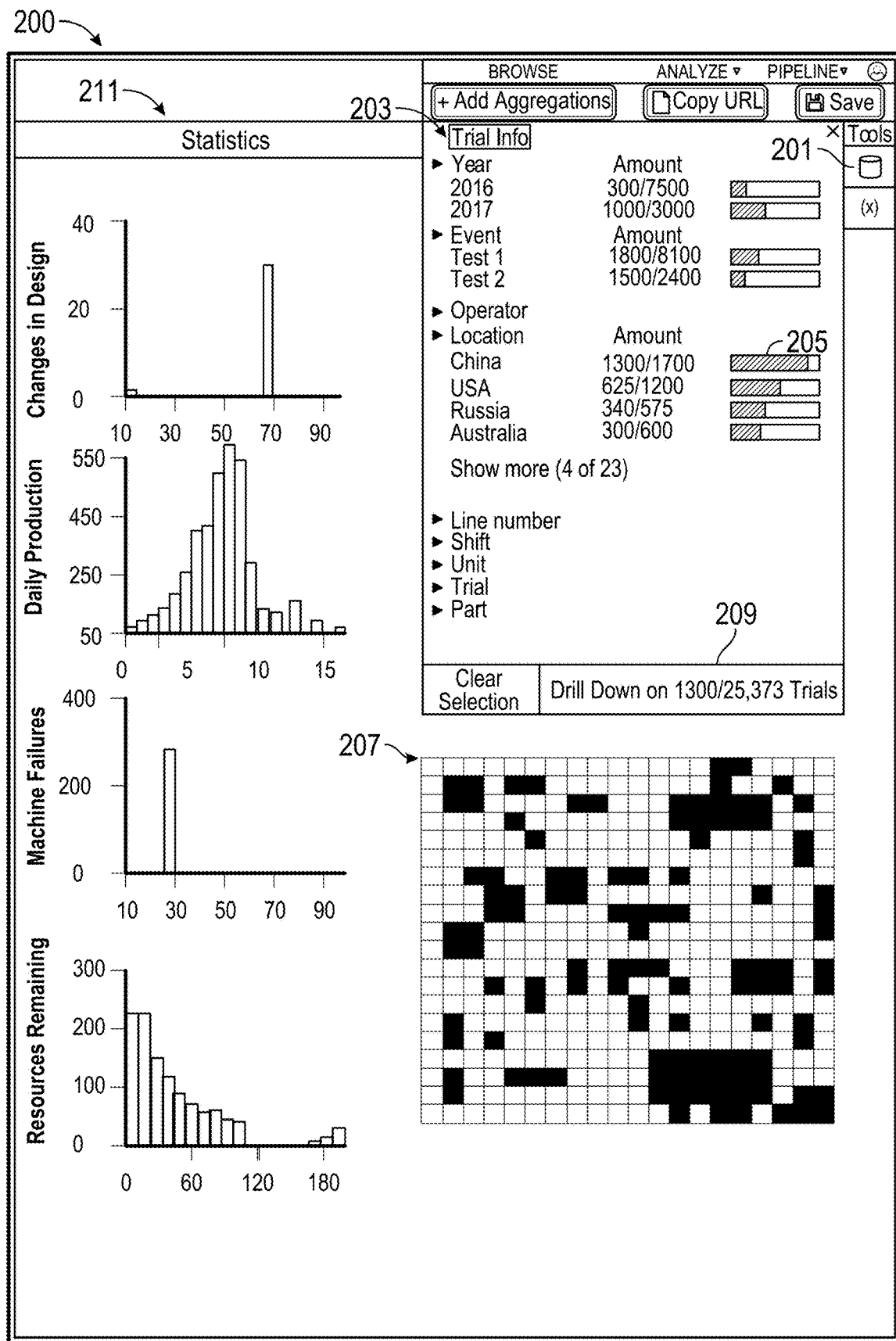
FIG. 2 shows example selection menus.

FIG. 2 shows example selection menus 200. For each trial of a prototype, multiple sensors can collect different types of time series data. Using the selection menus, a user can select which trials to analyze. The selection menus can be brought up by clicking the trial selection menu button 201. The menus shown in FIG. 2 can be used to display information in a variety of use cases disclosed herein. For example, each prototype can be a production group of a manufacturing factory, and each trial can be a production shift of a production group.

A trial information menu 203 includes trial-level metadata that an analysis can select in order to filter the available trials into a smaller trial set. This can include, for example a date range that the trial (e.g., a production shift) was performed, an operator performing the trial (e.g., a worker operating the production shift), a location where the trial was performed, a particular trial, etc. The trial-level metadata can be part of the metadata included in the second database 121 of FIG. 1. In some embodiments, an application or browser can obtain the types of available trial level metadata from the second database, and then display the available trial level metadata. For example, the application or browser can query the second database to determine that data is available for years 2016 and 2017, and then display the "Year" category and "2016" and "2017" subcategories.

Distribution data 205 can also be shown. The distribution data 205 indicates a breakdown of how many trials satisfy each trial-level filter criteria. For example, there were 3000 trials (e.g., 3000 production shifts) performed in 2017, and there were also 1700 trials performed in China (at any time). A user can select which trial data to use, for example, by selecting the year 2017 and the location of China. The distribution data 205 can then be updated to show what fraction of trials satisfy the selected trial-level filters. For example, out of the 3000 trials conducted in 2017, 1000 were conducted in China. Likewise, of the 1700 trials conducted in China, 1300 were conducted in 2017. A bar graph or other visualization can be displayed alongside the fractions to easily visualize the data for comparison. The distribution data can automatically update upon selections of new filter criteria by generating and sending a request to the server to access the metadata in order to determine how to update the distribution data.

A data representation graph 207 shows a representation of selected and/or filtered trials. Selected and/or filtered in trials can be indicated one way (e.g., with a first color) and unselected or filtered out trials can be indicated differently (e.g., with a different color). In some embodiments, the data representation graph shows a unit icon for every trial data. In some embodiments, the data representation graph shows a unit icon representative of a proportion of trial data (e.g., 1 unit icon=100 trials).

A drill down button 209 can be used to filter the trials based on currently selected metadata options. The data representation graph 207 can reset (e.g., make all icons the same color) and show selected icons (e.g., using a second color) as new trial-level filter options are selected in the trial information menu 203. Likewise, the distribution data 205 can then be updated the total number of trials that satisfy the currently selected metadata (e.g., the 2017 would show 3000 trials total) and further update to show the fraction of the total number of trials upon selection of new trial-level filter options are selected in the trial information menu 203 (e.g., update to show 500/3000 in 2017 after a particular operator is selected).

A statistics menu 211 can show a distribution of various parameters across a selected subset of trials. In some embodiments, the statistics menu shows histograms of how many trials are associated with a range of variable values. For example, an ambient temperature may be recorded once at the beginning of every trial. The distribution of trials having ranges of ambient temperatures can be shown in a histogram. The data in the statistics menu can also be stored in and retrieved from metadata in the second database 121 of FIG. 1. The titles of the histograms can be clicked, and a dropdown menu appears to show available categories of metadata for which histograms can be shown based on the available metadata in the second database. Particular trials can also be selected by interacting and selecting parts of the histograms. For example, the temperature histogram can be clicked to select trials performed under certain temperature conditions. In some embodiments, any of the metadata in the trial info menu 203 and in the histograms in the statistics menu 211 can be switched and shown in either one or both menus.

Figure 3:
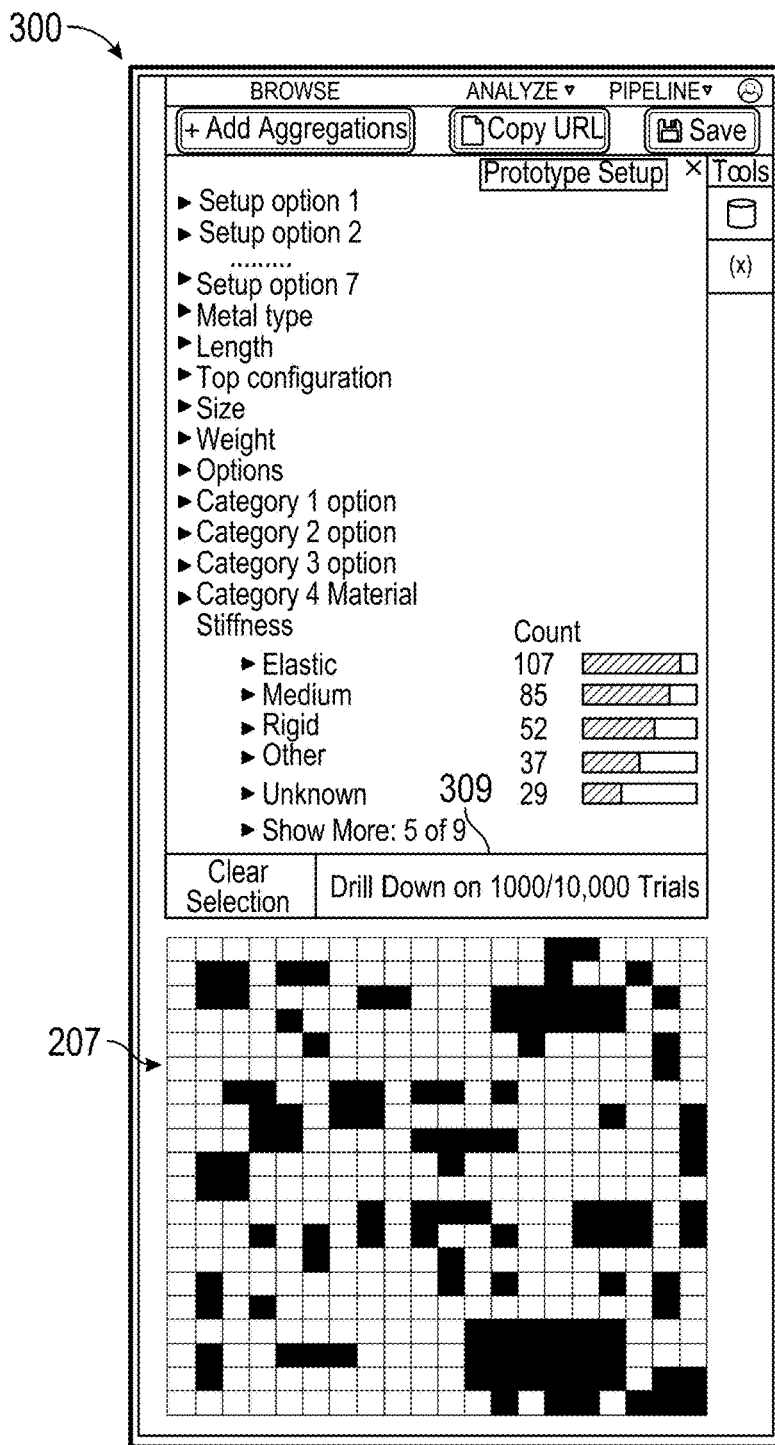
FIG. 3 shows an example prototype setup menu.

FIG. 3 shows an example prototype setup menu 300. In some embodiments, the trial selection menu 203, statistics menu 211, and prototype setup menu 300 can be simultaneously shown in the same interface. In some embodiments, any combination the menus 203, 211, 300 can be shown. In some embodiments, the menus 203, 211, 300 can be alternatively brought up, shown one at a time, and/or displayed in separate windows. The menus shown in FIG. 3 can be used to display information in a variety of use cases disclosed herein. For example, each prototype can be a manufactured component such as a spring, and each trial can be a test run of the component.

The prototype setup menu 300 includes expandable categories indicating different ways that the prototype can be set up. For example, the prototype setup menu shows different material stiffness levels including elastic, medium, rigid, and others. Distribution data is shown beside each stiffness option, indicating the number of trials conducted where a prototype had materials of each respective stiffness. The distribution data can be updated based on selections in any menu 203, 211, 300. In some embodiments, the listed categories of different prototype configurations displayed in the menu 300 can be determined by sending a request to a server to determine the different configuration options tracked in a metadata database.

Using these menus, an analyst can quickly filter and narrow down the vast amount of data that might be available based on metadata and greatly lower the number of time series data that needs to be accessed and read from a hard drive. Furthermore, by listing the metadata available, an analyst is reminded of the categories of available information that can be useful to in performing aggregate analysis. This can be helpful to inform an analyst of how many trials were performed when the prototype was configured a certain way or under which trial conditions. By accessing the metadata in the second database (e.g., 121 of FIG. 1), this information can be displayed much faster as compared to searching through all of the time series data to find this information.

In some embodiments, the selection of filters based on trial-level metadata can be saved. Accordingly, the filters can be loaded, and the filters can be run again when new sensor data is stored into the first database (e.g., 113 of FIG. 1). For example, if another trial is run with 20 sensors in 2017, the distribution data may automatically update and indicate that there are 3020 sensor data available, up from 3000.

In some embodiments, the prototype is a subway train or monorail train, and the trials are segments of a test railway. The menus can be used to narrow down a collection of sensor data to sensor data that was collected for segments. For example, the fastest segments by a particular train configuration can be selected for 2016, or all segments can be selected when the train has five or more sections and then again selected for when the train is weighted with passengers and luggage in order to compare segment times. As another example, the data for the same train can be selected on the same section, and then the stopping distance can be analyzed when the train uses different brake materials.

In various embodiments, the prototype can be a car (e.g. testing for performance or safety), boat, airplane, electronic device, etc. The trials for the prototypes can occur in a test environment. Sensor data can measure various properties, such as speed, acceleration, temperature, power, etc. The menus can be used to filter all available sensor data down to select a subset of sensor data (e.g., for specific trials, or for particular builds of the prototype).

Figure 5:
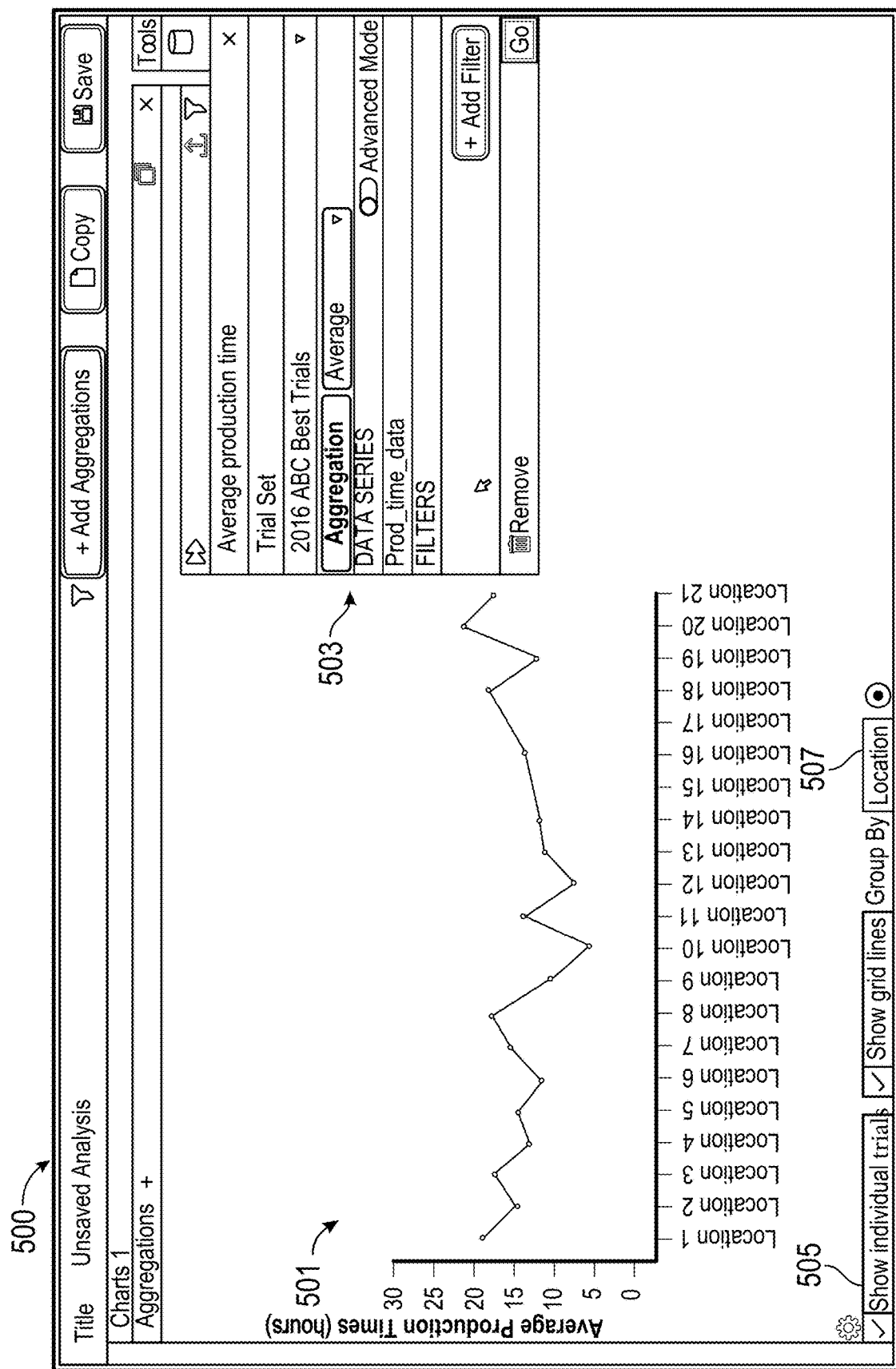
FIG. 5 shows an example interface for aggregate analysis.
Figure 6:
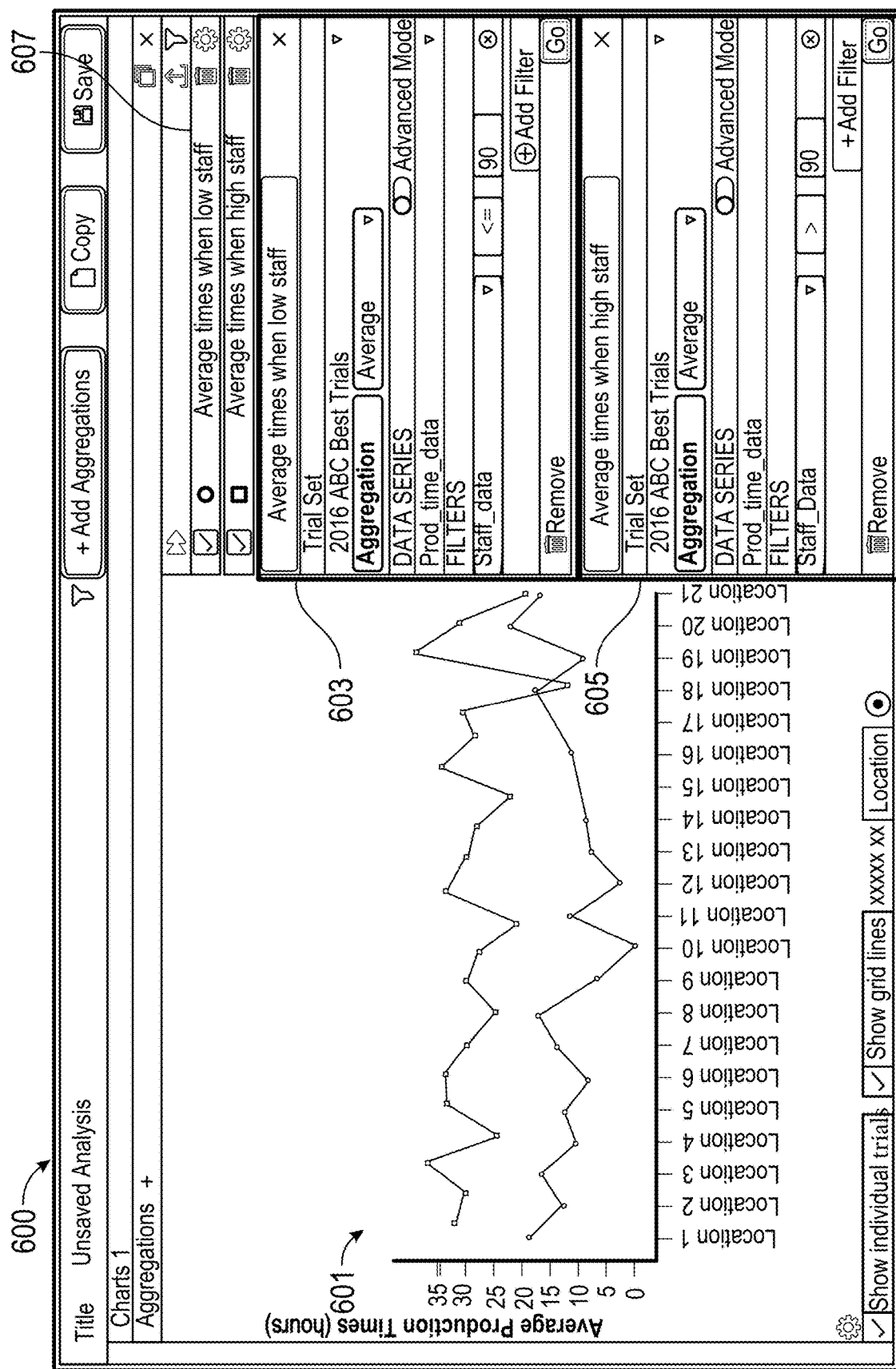
FIG. 6 shows another example interface for aggregate analysis.

FIG. 4 shows an example interface 400 for aggregating trial sets. The interface can include a first menu 401 that includes a list 402 of trial sets and also includes buttons for adding different types of trial sets or data series to the list. Clicking on the button 403 "Add Static Trial Set" can cause a static trial selection menu 405 to be displayed, and clicking on the button "Add Derived Trial Set" can cause an input trial set menu 407 to be displayed. Clicking "Add statistics trial set" can cause the statistics trial menu 409 to be displayed. Clicking "Add telemetry series" can open a menu for selecting a specific sensor to have the sensor's data displayed. In the add telemetry series mode, data from multiple sensors can be selected and combined in a mathematical function. For example, the left side pressure from a first sensor and right side pressure from a second sensor can be added and divided by two in order to determine an average. Clicking "Add derived series" opens a similar menu to 407, but for individual data series instead of for trials. Clicking "Add Trial Scalar Series" can open up a menu 411. The different menus discussed herein can be used to select trial sets and/or series to perform aggregate analysis on and to display (e.g., as shown in FIG. 5 and FIG. 6).

The static trial set can be given a name (e.g., "test") and defined by importing a selection of filters. The filters can be applied to a current selection of trials (e.g., selected using the selection menus shown in FIG. 2 and FIG. 3) at runtime. The existing selection can then be reduced by applying the filters. Alternatively, the static trial set can be selected by using the example selection menus in FIG. 2 and FIG. 3 to filter through the available trials until a desired subset is selected. The static trial set can be defined and saved as an unchanging set of trials and/or set of trial identifiers. Accordingly, re-running the same analysis on a static trial set will yield the same, repeatable results. In some embodiments, newly available sensor data from recent trials are not added to a statically defined set of trials.

A derived trial set can be given a name (e.g., "2016 ABC trials") and defined using the input trial set menu 407 or menu 413. The derived trial set can be derived based on one or more underlying trial sets based on filter criteria, and the derived trial sets can change as new sensor data is added to the first database (e.g., database 113 of FIG. 1). The derived trial set shows an alternative to the selection menus in FIG. 2 and FIG. 3 for selecting trials. The input trial set menu 407 provides filter options 408 that can be used in conjunction or in disjunction. The options 408 can include a metadata field (e.g., year) that is available in the second database (e.g., database 121 in FIG. 1). Also, the available values (e.g., 2017), for the corresponding metadata fields are provided in a drop down menu. The metadata fields and available values can be determined by querying the second database. The filter criteria operations describing a derived trial set can be static or saved. The data underlying the derived trial set can be dynamic. For example, the derived trial set can include data from any new trials that match the filter for all trials in 2017. As new trials are performed in 2017, the number of trials included in the derived trial set will increase. In some embodiments, derived series and trials sets can be computed on the front end (e.g., by computer 127). As another example shown in menu 413, the slowest trial times for different operators can be defined by finding maximum trial times of those operators. The menu also allows a plurality of inputs to be selected, which can be aggregate results such as "average temperatures when high speed" and "average temperatures when low speed." These aggregate results are given variable names (e.g., C1, C2) and a custom function can then be written, such "C1-C2." The aggregation function and the custom function can be coded in different languages. For example, one can be coded in Java and the other can be coded in Apache Groovy. This way, one language can be evaluated per data while the other language is evaluated in post processing. This allows the computation of both the average of the difference between the two variables, and also the difference of the two average forces. In some embodiments, one language (e.g., JavaScript) can be executed in the front end (e.g., by a browser in computer 127) while the other language is executed in the back end (e.g., by server 107).

A statistics trial set can be a set of trails built based on the aggregation of trial metadata. For example, as shown in statistics trial menu 409, a fastest trial can be selected from among all trials at a particular location performed by a specific operator. A property can be selected, such as trial time, and a function can be written to find and select the trial from among that set all trials at a particular that was performed by a specific operator having the minimum trial time. Accordingly, all data (e.g., for temperature, speed, force) would be provided for the fastest trial at the particular location by the specific operator. Other functions include finding a maximum, average, count, specific values, standard deviation, etc.

A trial scalar series menu 411 allows for operations on other aggregate results and/or allows aggregations of trial level properties that exist as metadata. For example, the menu 411 allows a new aggregate function (e.g., max, min, average, count, standard deviation) to be performed. As another example, average temperatures at different locations can be determined using the trial scalar series menu. As an example shown in trial scalar series menu 411, a slowest trial can be determined for all trials in 2016. The input trial set can be selected, "maximum" selected as the aggregation function to perform, and the "trial times" selected as the variable to find the maximum of.

Clicking "Add derived series" opens a similar menu to 407, but for individual data series instead of for trials. The derived series allows computations on the generated aggregates. For example, if aggregates include "average temperatures when high speed" and "average temperatures when low speed," a series can be generated by taking a difference between the aggregates.

In various embodiments, any combinations of operations on any of the different types of trials and series can be computed in the front end (e.g., by computer 127) or in the back end (e.g., by the server 107).

FIG. 5 shows an example interface 500 for aggregate analysis. FIG. 5 includes an aggregated results panel 501 showing a graph and a first menu 503 for adding aggregate analysis of trial sets to display. The example interface can be displayed on a computer, such as computer 127 of FIG. 1. The menus shown in FIG. 5 can be used to display information in a variety of use cases disclosed herein. For example, each prototype can be a production group or assembly line of a manufacturing factory, each trial can be a production shift of a production group that takes a certain amount of time to produce a quota of manufactured goods, and there can multiple factories located at different locations.

The example aggregated results panel 501 includes a line graph showing the aggregate analysis for average production time at different factory locations. The x-axis indicates different locations 1-21. The grouping criteria used for the x-axis can be selected from a drop down menu 507. The options in the drop down menu can include any metadata field available in the second database (e.g., database 121 of FIG. 1). The y-axis indicates an average production time. The dots on the line indicate average production times at each location. Additional dots at each location can indicate other statistical distribution of data, such as outliers, the 25% and 75% spread rates, the range, etc. In some embodiments, the dots can indicate the average production times of each individual trial associated with the respective locations. In some embodiments, the display of the dots indicating the average production times of each individual trial can be turned on an off with a button 505.

A menu 503 can provide options for what to display in the graph. The menu can provide a title (e.g., "average production time") and allow a trial set (e.g., "2016 ABC Best Trials) to be selected from a drop down menu. The selection of trial sets are discussed with respect to FIG. 2, FIG. 3, and FIG. 4. The menu 503 also provides an aggregation operation to perform. Example aggregations include finding maximums, minimums, averages, counts, ranges, modes, correlation, or any type of statistical analysis. A data series field provides a drop down menu of types of data series that are available in the first database (e.g., database 113 in FIG. 1). The data series can include any type of time series data measured by a sensor, such as speed, pressure, temperature, etc. Additional filters can be defined for the data to be displayed in the graph.

The aggregation results panel shows aggregate analysis results of time series data stored on a server (e.g., server 107 in FIG. 1). The server can have a first database (e.g., database 113) storing different kinds of time series data, including as production time data, power consumption data, resource consumption data, etc. The server can also include a second database (e.g., database 121) storing metadata about the time series data in the first database, including which time series data are production time data, and which time series data are associated with which locations.

To determine an average production time at each location, the second database can be accessed and searched to find the addresses of or references to production time data at different locations. The production time data can then be read from the first database using the addresses or references without finding or reading unnecessary data (e.g., without finding or reading temperature data). The production time data can be analyzed and averaged for each location, and the results can be graphed.

Alternatively, a slower approach can include reading the time series data from the first database, determining if each time series data is production time data, and if so, analyzing the production time data to determine the average production time for each location. The slower approach can yield the same result, but can take a much longer time.

FIG. 6 shows another example interface 600 for aggregate analysis. FIG. 6 includes an aggregated results panel 601 showing two graphs, a first menu 603 for adding a first aggregate analysis of a trial set to display, and a second menu 605 for adding a second aggregate analysis of a trial set to display. The example interface can be displayed on a computer, such as computer 127 of FIG. 1.

The first menu 603 is titled "average times when low staff." The selections in the first menu 603 include a trial set (e.g., "2016 ABC Best Trials") that can be a subset of all trial sets, an aggregation operation to perform (e.g., average), a data series to perform the aggregation operation on (e.g., "prod_time_data" collected from a sensor measuring production output), and additional filter criteria. The additional filter criteria can include sub-trial level (e.g., for a few minutes or a few hours out of a multi-hour production run) filters. The example filter criteria indicates to perform the averaging of the production time data only when corresponding staffing data in the same trial is indicated to be at low staffing capacity (e.g., the staff is less than or equal to 90% capacity).

The second menu 605 is titled "average times high staff." The selections in the second menu 605 include the trial set (e.g., "2016 ABC Best Trials") that can be a subset of all trial sets, an aggregation operation to perform (e.g., average), a data series to perform the aggregation operation on (e.g., "prod_time_data" collected from a sensor measuring production output), and additional filter criteria. The additional filter criteria can include sub-trial level (e.g., for a few minutes or a few hours out of a multi-hour production run) analysis filter criteria. For example, the sub-trial level analysis filter criteria indicates to perform the averaging of the production time data only when corresponding data in the same trial is indicated to be a high staffing capacity (e.g., at least 90% staffing capacity).

The computer system (e.g., computer system 127 of FIG. 1) can, based on the selections in the first and second menus 603, 605, automatically generate a query and/or request for the server (e.g., server 107 in FIG. 1) to perform the aggregate analysis. This can cause the server to access the second database (e.g., database 121) to determine which data series match the filter criteria (e.g., within 2016, by operator ABC, are the "best" trial results, are production time data, and are staffing data). The server can obtain the storage locations of those data series, and then access those specific data series from the first database, and then perform the requested aggregate analysis (e.g., do averaging). This can include averaging each data series. The server can then send the results of the aggregate analysis for display on the requesting computer system (e.g., computer system 127) to be displayed as the line graph. The server can also send the average of each data series to be displayed as the dots. A browser or application on the computer system (e.g., computer system 127 of FIG. 1) does not need to load the underlying data series from the first database into the application memory or browser memory.

The example interface 600 includes a list of aggregate data being displayed 607. The names of the aggregate data can be click on to bring up each respective menu (e.g., menu 603, 605) so that the analysis can be further modified. In response to any modification, requests/queries can be sent to the server again, and results from the server can be displayed in the aggregated results panel 601.

In some embodiments, the prototype is a train, car or plane, the y-axis data indicates a variable measured by a sensor on the train, car or plane, and the x-axis indicates a variable configuration of the train or plane during a test run.

Sub-trial computation and aggregate analysis can be performed by either the server 107 or the computer 127 of FIG. 1. For example, "average times when high staff" can include sub-trial computation. First, the desired trials can be filtered out (e.g., using the menus shown in FIG. 2 and FIG. 3). Next, of the remaining trials, the aggregate analysis can be defined—to find the average production times when a staff is at least 90% of maximum capacity within the same trial. This can cause the server to use the metadata in the second database to determine which sensors data is production time data, automatic data, and staff data for every qualifying trial, along with where the corresponding time series data is stored in the first database. The corresponding time series data can then be read from the first database, and sub-trial analysis can be performed. For example, the staff capacity data can be read to find all times when the staff capacity exceeds 90% of maximum capacity. The time series data for production times at the corresponding times can then be found and averaged. This example sub-trial level comparison analysis can be performed by the server 107.

Figure 7:
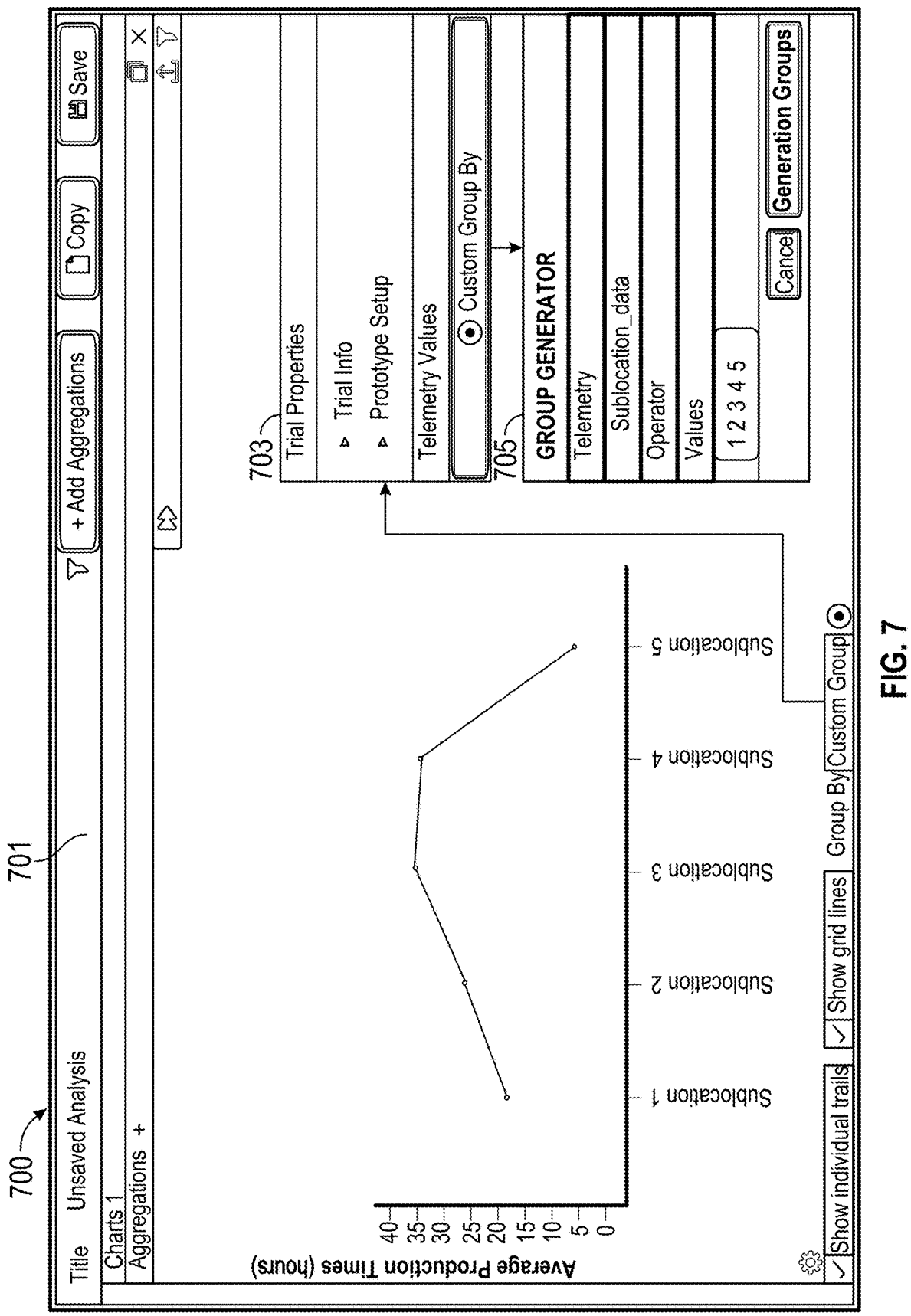
FIG. 7 shows another example interface for aggregate analysis.

FIG. 7 shows another example interface 700 for aggregate analysis. FIG. 7 includes an aggregated results panel 701 showing a graph of average production times for high staff production runs, calculated by sub-location and arranged on an x-axis indicating different sub-locations.

To change the interface 600 in FIG. 6 to show the interface 700 in FIG. 7, the name "average production times when low staff" can be deselected in the list of aggregate data being displayed 607. Then, the name "average production times when high staff" can be clicked to bring up its menu 605. In an example, a location of interest can be USA, so a filter can be added for Location=USA, or alternatively, the trial level filter for USA can be selected from the trial info menu 203 and saved for "2016 ABC Best Trials." Next, the "Group By" button can be clicked, causing menu 703 to display. Menu 703 can provide selectable options including the trial information, prototype options, and an option to create a custom group based on telemetry values. Clicking the button to create a custom group based on telemetry values can bring up another menu 705, which provides an option to select a particular sensor data (e.g., a sensor recording sublocation_data) and to select corresponding telemetry values. In an example embodiment where the location is the USA, the sensor data can be, for example, the first five states listed in alphabetical order. Upon generating the group of five states, the aggregated results panel 701 updates to show an x-axis arranged by the selected sub-location values.

In an example embodiment, the prototype is a factory, the production times indicates a time to make a quota number of products as measured by a sensor on an assembly line in the factor, the aggregated results panel 701 is shown for a particular factory, and the sub-locations indicate different assembly lines within the factory.

Figure 9:
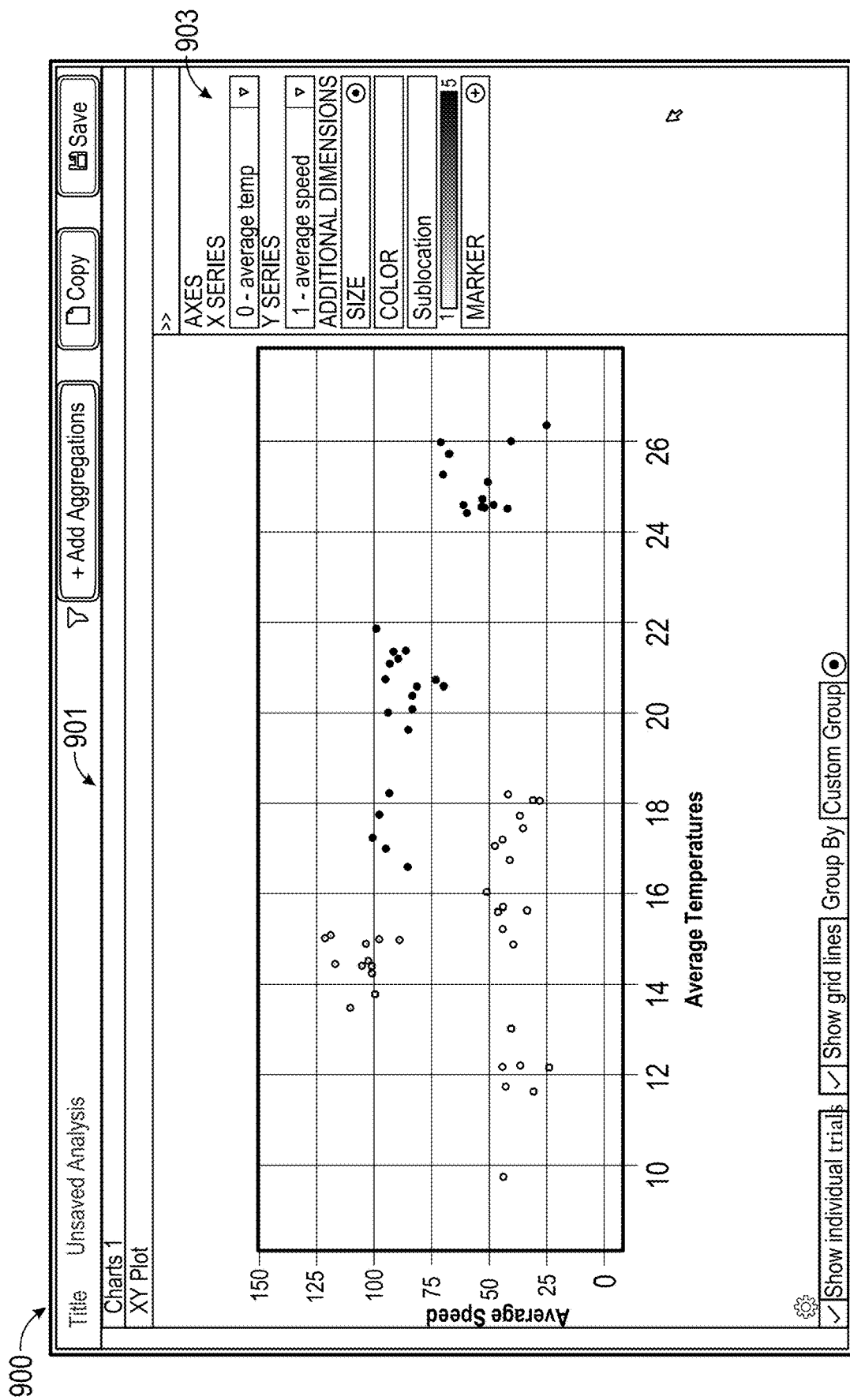
FIG. 9 shows another example interface for aggregate analysis.

FIG. 9 shows another example interface 900 for aggregate analysis. FIG. 9 includes an aggregated results panel 901 showing an X-Y correlation scatterplot indicating correlations between average temperatures and average speeds. The x-axis indicates average temperatures in multiples of a base temperature, and the y-axis indicates average speeds. The data series used for the x-axis and the y-axis can be selected from a menu 903.

The example interface can include an additional plot dimension such as color. The points in the scatterplot can be calculated per sub-location, and each sub-location can be represented with a different color. Accordingly, the aggregated results panel 901 shows how the temperature/speed correlation changes across sub-locations.

In some embodiments, the example embodiment can show how the average speed and average temperature on a portion of the train changes across different sections of a particular railway.

Figure 10:
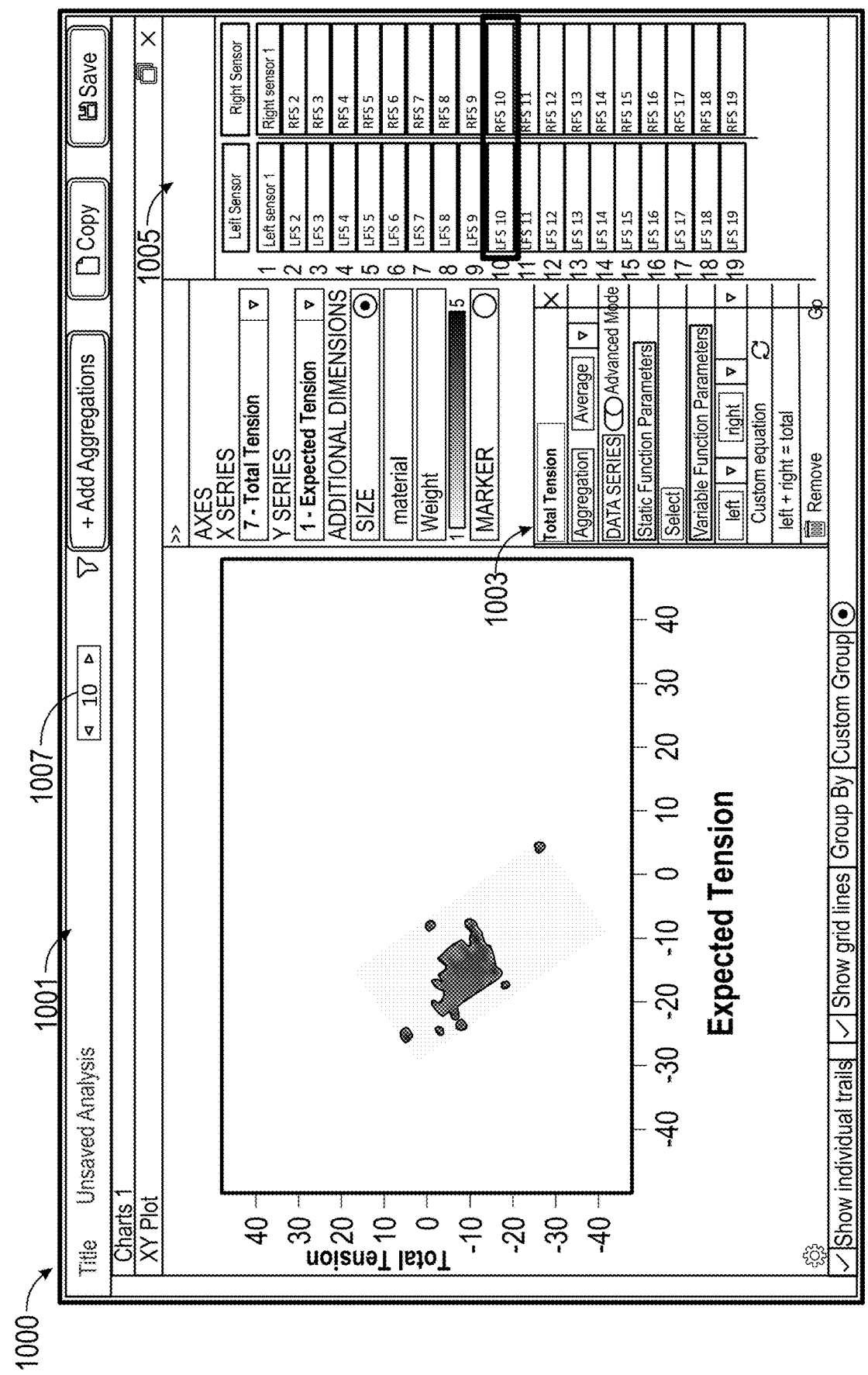
FIG. 10 shows an example interface for aggregate analysis.

FIG. 10 shows an example interface 1000 for aggregate analysis. FIG. 10 include an aggregated results panel 1001 showing an X-Y scatterplot indicating differences between an expected tension (e.g., calculated according to a hypothesis) and an actual tension measured by sensors. In an example embodiment, there are 38 pairs of tension sensors on a test robotic arm. The scatterplot also color codes the data based on an average weight being lifted by the robotic arm for each data point.

To avoid rebuilding the same type of aggregate analysis for each of the 38 different sensors, a "Total Tension" data series can be defined in a menu 1003 with reference to variables in a variable list 1005. The variables list 1005 includes a first variable "Left" and a second variable "Right," which are defined to be the pairs of 38 sensors. In the menu 1003, the variables "Left" and "Right" can be used in a custom equation to calculate the total tension measured by the two sensors. The total tension can then be used in aggregate analysis to determine the difference between the expected total tension and the total tension measured by the sensors.

At the top of the aggregated results panel 1001, a variable navigation menu 1007 can be clicked to increment or decrement the variable. The aggregate analysis shown in the X-Y scatterplot automatically updates to show the results based on the corresponding sensors. Such aggregate analysis scatterplots can be used to compare estimated tension against actual values, across a range of sensors on different parts of the robotic arm, in order to determine if the hypothesis used to generate the estimated total power consumption is accurate.

Example Methods

Figure 11:
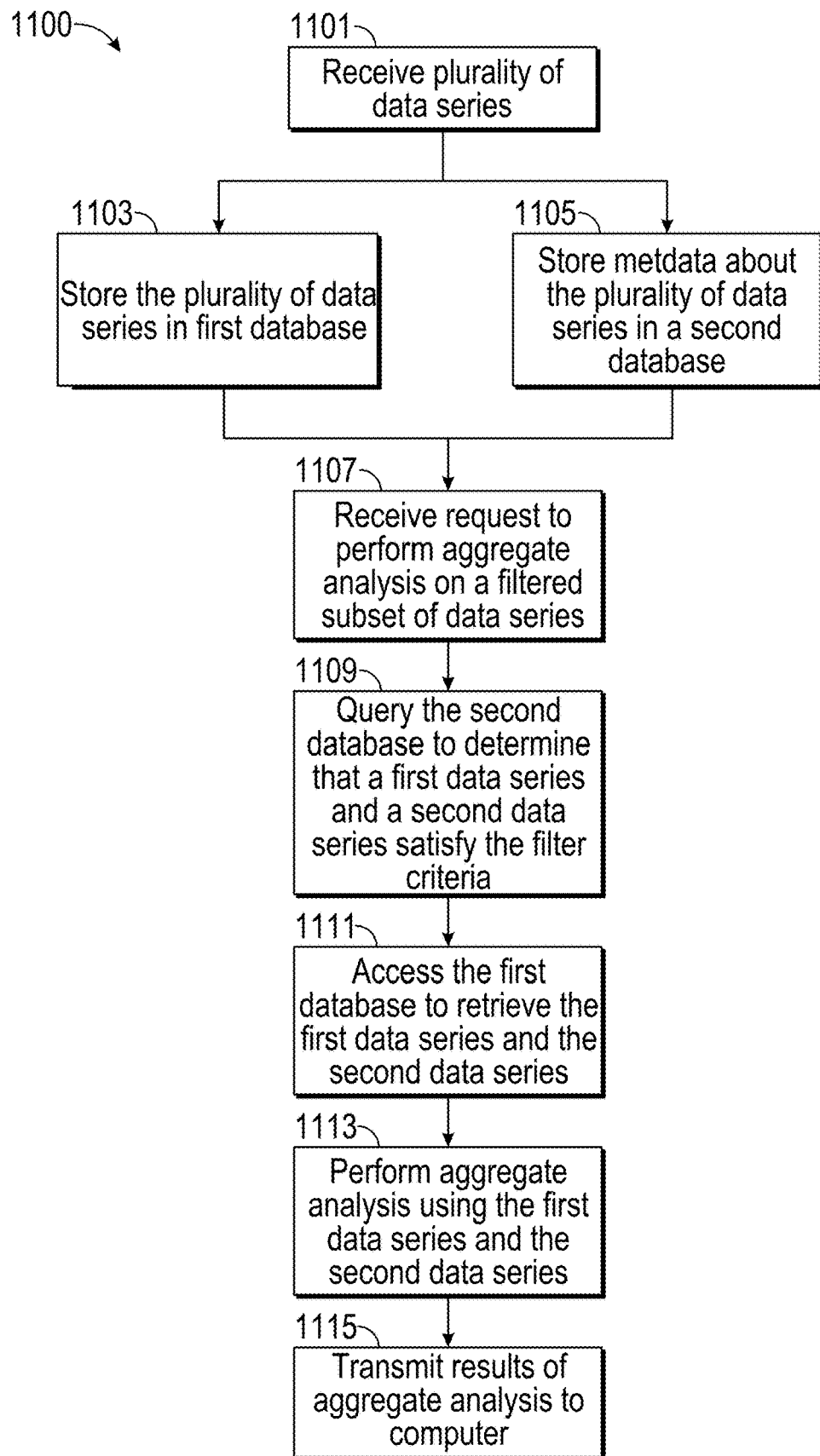
FIG. 11 is a flow chart that illustrates an example method for performing aggregate analysis.

FIG. 11 shows a flow chart of an example method for performing aggregate analysis on time series data.

At block 1101, a plurality of data series can be received. The plurality of data series can include a first data series and a second data series that are time series data. The time series data can be provided as CSV's or in any other format.

At block 1103, the plurality of data series can be stored in a first database, such as database 113 of FIG. 1.

At block 1105, metadata about each data series in the plurality of data series can be stored in a second database, such as database 121 in FIG. 1. In some embodiments, the metadata can be extracted from each data series. In some embodiments, the metadata can be received or otherwise provided.

At block 1107, a request can be received to perform an aggregate analysis on a filtered subset of data series. The aggregate analysis can include finding a maximum, average, count, specific values, standard deviation, mode, range, or any other statistical analysis on the plurality of data series.

At block 1109, the second database can be queried to find which data series of the plurality of data series satisfy the filter criteria. It can be determined that a first data series satisfies the filter criteria. In some embodiments, it can also be determined that a second data series satisfies the subset criteria. In some embodiments, the filter criteria can include trial level filter criteria. In some embodiments, filter criteria can include sub-trial level filter criteria.

At block 1111, the first database can be accessed to retrieve the data series that satisfy the subset criteria, such as the first data series and the second data series. In some embodiments, a substantial amount of time is saved in comparison to reading available data series from the first database and then performing filtering.

At block 1113, the aggregate analysis can be performed using the first data series. In some embodiments, performing the aggregate analysis can include using the second data series. In some embodiments, a plurality of processors or a cluster of servers performs sub-trial level data analysis.

At block 1115, the results of the aggregate analysis are transmitted to a computer, such as computer 127 of FIG. 1. In some embodiments, a portion of the aggregate analysis can be performed by the computer 127. In some embodiments, the results of the aggregate analysis are determined substantially faster, and much less data is transferred. In some embodiments, the results of the aggregate analysis can be cached in memory or stored in the first database, and the metadata table can be updated to include the results of the aggregate analysis, and the metadata for the aggregate analysis can inherit properties from the metadata filter used to generate the aggregate analysis. In some embodiments, the results of the aggregate analysis can be stored by the computer and used in subsequent aggregate analysis without needing to re-perform the aggregate analysis.

Figure 12:
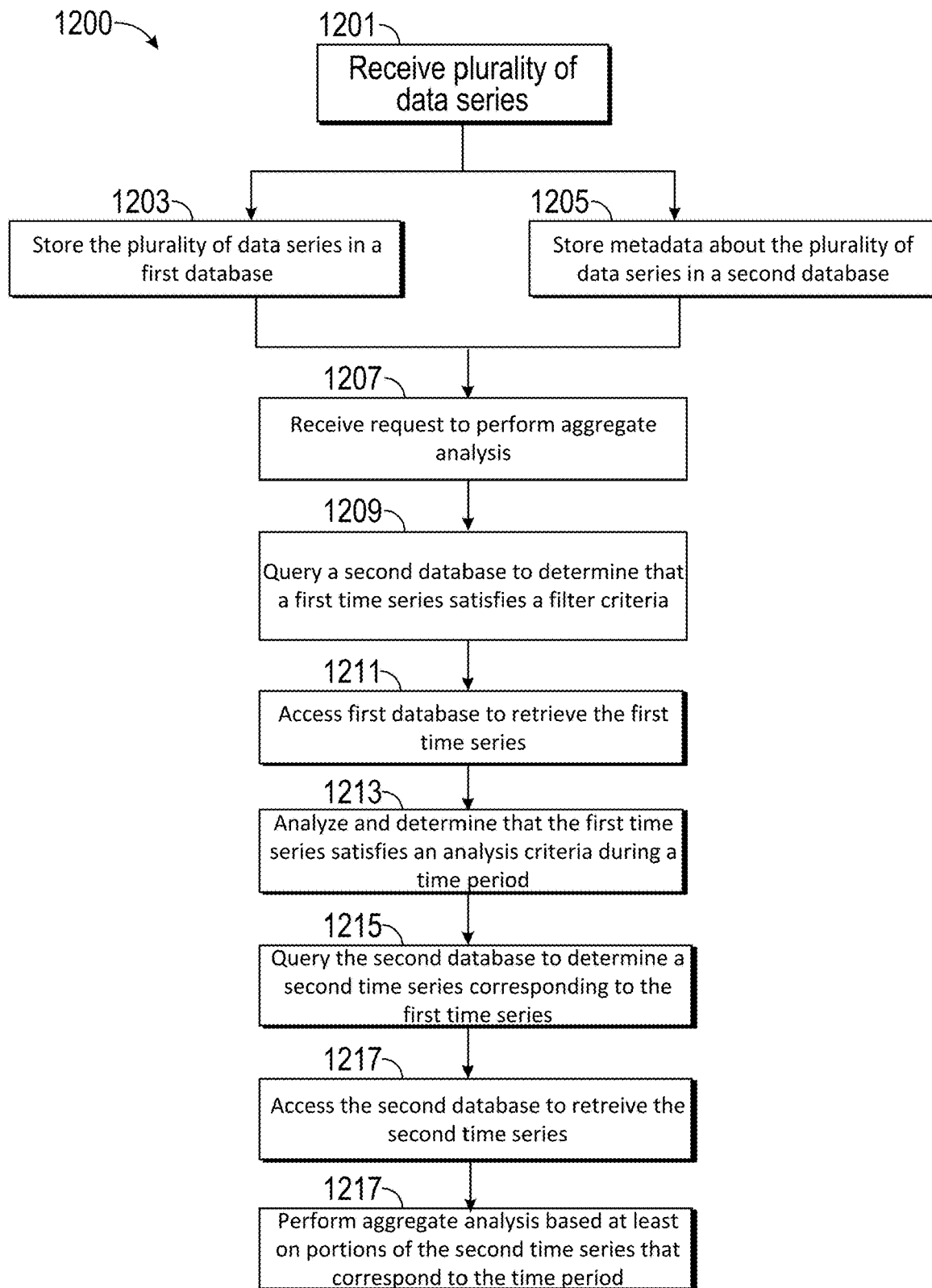
FIG. 12 is a flow chart that illustrates an example method for performing aggregate analysis.

FIG. 12 shows a flow chart of an example method for performing aggregate analysis on time series data.

At block 1201, a plurality of data series can be received. The plurality of data series can include a first data series and a second data series that are time series data. The time series data can be provided as CSV's or in any other format.

At block 1203, the plurality of data series can be stored in a first database, such as database 113 of FIG. 1.

At block 1205, metadata about each data series in the plurality of data series can be stored in a second database, such as database 121 in FIG. 1. In some embodiments, the metadata can be extracted from each data series. In some embodiments, the metadata can be received or otherwise provided.

At block 1207, a request can be received to perform an aggregate analysis on a filtered subset of data series. The request can include, for example, a filter criteria, an analysis criteria, and a type of aggregate analysis to perform. For example, the request can be to determine an average temperature during trials when a speed was above 100, for all trials in 2017. In such an example, the aggregate analysis is to determine averages, the filter criteria is for trials in 2017, and the analysis criteria is when a speed was above 100.

At block 1209, the second database can be queried to find one or more time series that satisfy the filter criteria. The one or more time series that satisfies the filter criteria can include, for example, a first time series for speed for a first trial in 2017 and a second time series for speed for a second trial in 2017.

At block 1211, the time series that satisfy the filter criteria can be retrieved from a first database.

At block 1213, the one or more time series that satisfy the filter criteria can be analyzed. This can include, for example, determining that the speed exceeded 100 for the first time series between the 1-2 minute mark, and that the speed exceeded 100 for the second time series between the 3-4 minute mark.

At block 1115, the second database can be queried to determine a second time series corresponding to the first time series. For example, this can include determining the time series for temperature for the first trial in 2017, and determining the time series for temperature for the second trial in 2017.

At block 1217, aggregate analysis can be performed based, at least in part, on portions of the second time series that correspond to the time period. For example, the average temperature can be calculated based on the time series for temperature for the first trial in 2017 between the 1-2 minute mark and based on the time series for temperature for the second trial in 2017 between the 3-4 minute mark. The result of the aggregate analysis can be provided to a computer.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
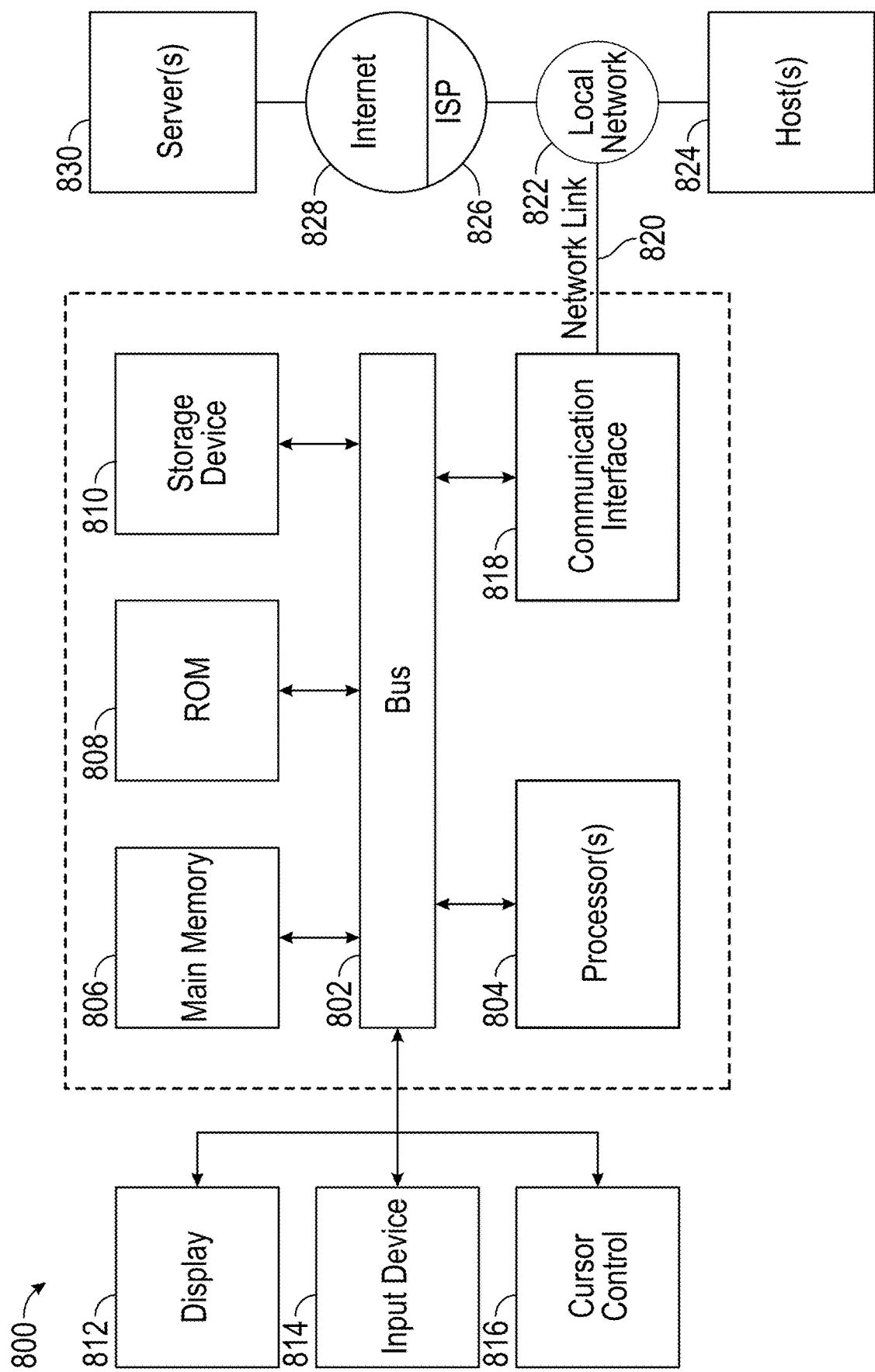
FIG. 8 is a block diagram that illustrates a computer system upon which various embodiments may be implemented.

For example, FIG. 8 is a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a communications interface configured to receive a plurality of data series, the plurality of data series including time series data captured by a plurality of sensors;
one or more storage devices configured to store:
a first database storing a plurality of sets of time series data in a plurality of storage devices; and
a second database storing metadata related to the plurality of sets of time series data, the metadata including information for locating sets of time series data from the first database and properties of the sets of time series data; and
one or more processors configured to:
receive, via a user input to a user interface, an indication of metadata filter criteria useable for filtering the sets of time series data based on the properties of the sets of time series data;
determine, based on the stored metadata in the second database, a number of subsets of the sets of time series data satisfying the metadata filter criteria;
provide an indication, for display in the user interface, of the number of subsets;
access the second database to identify, based on the stored metadata, the determined subsets of the sets of time series data that satisfy the metadata filter criteria and information for locating the determined subsets in the first database;
receive an instruction including an indication of a computation;
access the determined subsets from the first database; and
perform the computation using at least one of the determined subsets accessed from the first database.

2. The system of claim 1, wherein the one or more processors are further configured to:
query the second database to determine at least a second subset of the sets of time series data that satisfies the metadata filter criteria;
access, from the first database and based on results of the query of the second database, the second subset of time series data; and
determine one or more portions of the second subset of time series data that satisfy a threshold criteria.

3. The system of claim 2, wherein the subset corresponds in time with the one or more portions of the second subset of time series data that satisfies the threshold criteria.

4. The system of claim 1, wherein the time series data includes measurements captured by a plurality of data measurement sensors for a plurality of trials, and wherein the plurality of data measurement sensors includes different data measurement sensors that make different types of measurements.

5. The system of claim 1, wherein the properties of the sets of time series data include: properties of devices associated with the sensors and configuration of the devices being tested during trials.

6. The system of claim 1, wherein the information for locating sets of time series data from the first database includes at least one of: a storage location of, a reference to, or an identifier of particular sets of time series data.

7. The system of claim 1, wherein the metadata includes a first metadata field that applies to entire sets of time series data and a second metadata field that applies to less than an entirety of the sets of time series data.

8. The system of claim 1, wherein the determined subsets are identified, based on the stored metadata, to satisfy the metadata filter criteria without accessing the first database.

9. The system of claim 1, wherein the computation includes determining at least one of: a maximum, average, count, specific values, correlation, or standard deviation.

10. The system of claim 1, wherein:
the one or more processors are configured to transmit data to a user interface configured to show a grid representing a quantity of the plurality of time series data in the first database; and
the one or more processors are configured to transmit data to the user interface to update, in response to receiving the indication of metadata filter criteria, the grid to show a quantity of and storage distribution of time series data in the second database that satisfy the indication of metadata filter criteria as a highlighted proportion of the grid.

11. A computer system comprising:
one or more computer readable storage devices configured to store one or more software modules including computer executable instructions; and
one or more hardware computer processors in communication with the one or more computer readable storage devices and configured to execute the computer executable instructions in order to cause the computer system to:
query a first database in a server for available metadata fields associated with a plurality of sets of time series data stored in a second database, the time series data including measurements generated by one or more sensors;
cause a display, in a user interface, of a representation of a number of sets of time series data associated with a plurality of metadata fields in the first database;
receive a selection, via the user interface, of a metadata filter criteria comprising a subset of the available metadata fields;
transmit, to the server, an indication of the selected metadata filter criteria for the server to access the first database to identify, based on the available metadata fields stored in the first database, a subset of the plurality of sets of time series data that satisfy the selected metadata filter criteria and information for locating the subset in the second database;
send, to the server, an indication of an aggregate analysis;
receive, from the server, a result of the aggregate analysis performed on the subset; and
cause display of a graphical visualization of the result.

12. The computer system of claim 11, wherein the one or more hardware computer processors are further configured to execute the computer executable instructions in order to cause the computer system to:
cause a display of a representation of a number of sets of time series data associated with a first metadata field in the first database; and
cause a display of a representation of a number of sets of time series data that are both associated with the first metadata field and satisfy the filter criteria.

13. The computer system of claim 11, wherein the one or more hardware computer processors are further configured to execute the computer executable instructions in order to cause the computer system to:

cause a display of a representation of a number of data series associated with the selected metadata filter criteria in the first database.

14. The computer system of claim 11, wherein the aggregate analysis is a correlation analysis.

15. The computer system of claim 11, wherein the server identifies the subset of the plurality of sets of time series data that satisfy the selected metadata filter criteria without accessing the second database.

16. The computer system of claim 11, wherein the graphical visualization is an X-Y scatterplot that depicts a third dimension with colored data points.

17. The computer system of claim 11, wherein the one or more hardware computer processors are further configured to execute the computer executable instructions in order to cause the computer system to:
  after a new set of time series data is stored in the second database, send a second request for the server to perform the aggregate analysis on the plurality of time series data stored in the second database that satisfy the filter criteria, wherein the new set of time series data satisfies the filter criteria;
  receive a second result of the aggregate analysis from the server, the second result being based at least in part on the new set of time series data; and
  cause a display of a graphical visualization of the second result.

18. The computer system of claim 11, wherein the one or more hardware computer processors are further configured to execute the computer executable instructions in order to cause the computer system to:
  receive a definition of a variable, wherein the metadata filter criteria references the variable when the variable has a first value; and
  determine second metadata filter criteria when the variable has a second value;
  send a second request for the server to perform the aggregate analysis on one or more sets of time series data stored in the second database that satisfy the second metadata filter criteria;
  receive a second result of the aggregate analysis from the server; and
  cause a display of a second graphical visualization of the second result.

19. The computer system of claim 11, wherein the one or more hardware computer processors are further configured to execute the computer executable instructions in order to cause the computer system to:
  receive a second selection of second filter criteria comprising a second subset of the available metadata fields;
  receive a second selection of a second aggregate analysis to perform;
  send a second request for the server to perform the second aggregate analysis on any sets of time series data stored in the second database that satisfy the second filter criteria;
  receive a second result of the second aggregate analysis from the server; and
  cause a simultaneous display of a second graphical visualization of the second result on a same interface that the graphical visualization of the result is displayed.

* * * * *